(12) United States Patent
Smith

(10) Patent No.: US 11,944,044 B2
(45) Date of Patent: Apr. 2, 2024

(54) TREE PUSHER ADAPTER DEVICE

(71) Applicant: Wayne J. Smith, Brookhaven, MS (US)

(72) Inventor: Wayne J. Smith, Brookhaven, MS (US)

(*) Notice: Subject to any disclaimer, the term of this patent is extended or adjusted under 35 U.S.C. 154(b) by 559 days.

(21) Appl. No.: 17/232,572

(22) Filed: Apr. 16, 2021

(65) Prior Publication Data

US 2022/0330497 A1  Oct. 20, 2022

(51) Int. Cl.
| | |
|---|---|
| *A01G 23/08* | (2006.01) |
| *F16B 2/06* | (2006.01) |
| *A01G 17/10* | (2006.01) |
| *A01G 23/099* | (2006.01) |
| *B66F 1/06* | (2006.01) |
| *B66F 3/08* | (2006.01) |
| *B66F 3/24* | (2006.01) |
| *B66F 19/00* | (2006.01) |
| *F02F 7/00* | (2006.01) |

(52) U.S. Cl.
CPC .............. *A01G 23/08* (2013.01); *F16B 2/065* (2013.01); *A01G 17/10* (2013.01); *A01G 23/099* (2013.01); *B66F 1/06* (2013.01); *B66F 3/08* (2013.01); *B66F 3/24* (2013.01); *B66F 19/00* (2013.01); *F02F 7/0053* (2013.01)

(58) Field of Classification Search
CPC ...... A01G 23/08; A01G 23/099; A01G 17/10; F16B 7/0413; F16B 2/065; F16B 7/0053; B66F 19/00; B66F 3/24; B66F 3/08; B66F 1/06
See application file for complete search history.

(56) References Cited

U.S. PATENT DOCUMENTS

| | | | | |
|---|---|---|---|---|
| 1,085,814 A | * | 2/1914 | Kramer | F02F 7/0053 |
| | | | | 173/171 |
| 1,325,963 A | * | 12/1919 | Templeton | B66D 3/02 |
| | | | | 254/133 R |
| 1,482,846 A | * | 2/1924 | Harrah | B66F 19/00 |
| | | | | 254/133 R |
| 2,840,932 A | * | 7/1958 | Breyer | E02F 3/8152 |
| | | | | 172/252 |
| 2,960,309 A | * | 11/1960 | Swanson | B66F 3/24 |
| | | | | 254/133 R |
| 3,014,696 A | * | 12/1961 | Trott | A01G 23/099 |
| | | | | 144/34.2 |

(Continued)

FOREIGN PATENT DOCUMENTS

| | | | | |
|---|---|---|---|---|
| CN | 207322204 U | * | 5/2018 | ........... A01G 23/099 |
| CN | 108812173 A | * | 11/2018 | ........... A01G 23/099 |
| DE | 20014534 U1 | * | 12/2000 | ........... A01G 23/099 |

*Primary Examiner* — Arpad Fabian-Kovacs
(74) *Attorney, Agent, or Firm* — Laurence P. Colton; Smith Tempel Blaha LLC

(57) ABSTRACT

A device is mounted to the end of a log so that a skid steer may use the log to engage a tree targeted for felling. The device includes implements configured for engaging the target tree to be felled to give the operator of the device control over the target tree. The device is structured to push the target tree over such that the root ball of the target tree rises up out of the ground as the target tree is felled and/or to allow the operator to make cuts to the target tree before the device is use to push the tree in the desired direction of fell.

20 Claims, 19 Drawing Sheets

(56) References Cited

U.S. PATENT DOCUMENTS

| | | | | |
|---|---|---|---|---|
| 3,685,800 A * | 8/1972 | Schock | ............... | B66F 3/24 |
| | | | | 254/133 R |
| 3,778,031 A * | 12/1973 | Enander | ............ | A01G 23/099 |
| | | | | 254/133 R |
| 4,148,462 A * | 4/1979 | Jessup | ............. | A01G 23/099 |
| | | | | 254/133 R |
| 4,564,173 A * | 1/1986 | Atherton | ............. | B66F 1/06 |
| | | | | 254/133 R |
| D373,884 S * | 9/1996 | Price | ............... | D34/31 |
| 6,604,562 B1 * | 8/2003 | Smith | ............... | A01G 23/091 |
| | | | | 144/34.1 |
| 8,490,328 B1 * | 7/2013 | Glover | ............ | A47G 33/1213 |
| | | | | 47/40.5 |
| 2004/0103957 A1 * | 6/2004 | Smith | ............. | B66F 3/08 |
| | | | | 144/34.2 |
| 2006/0037666 A1 * | 2/2006 | Smith | ............. | B66F 3/08 |
| | | | | 144/34.2 |

\* cited by examiner

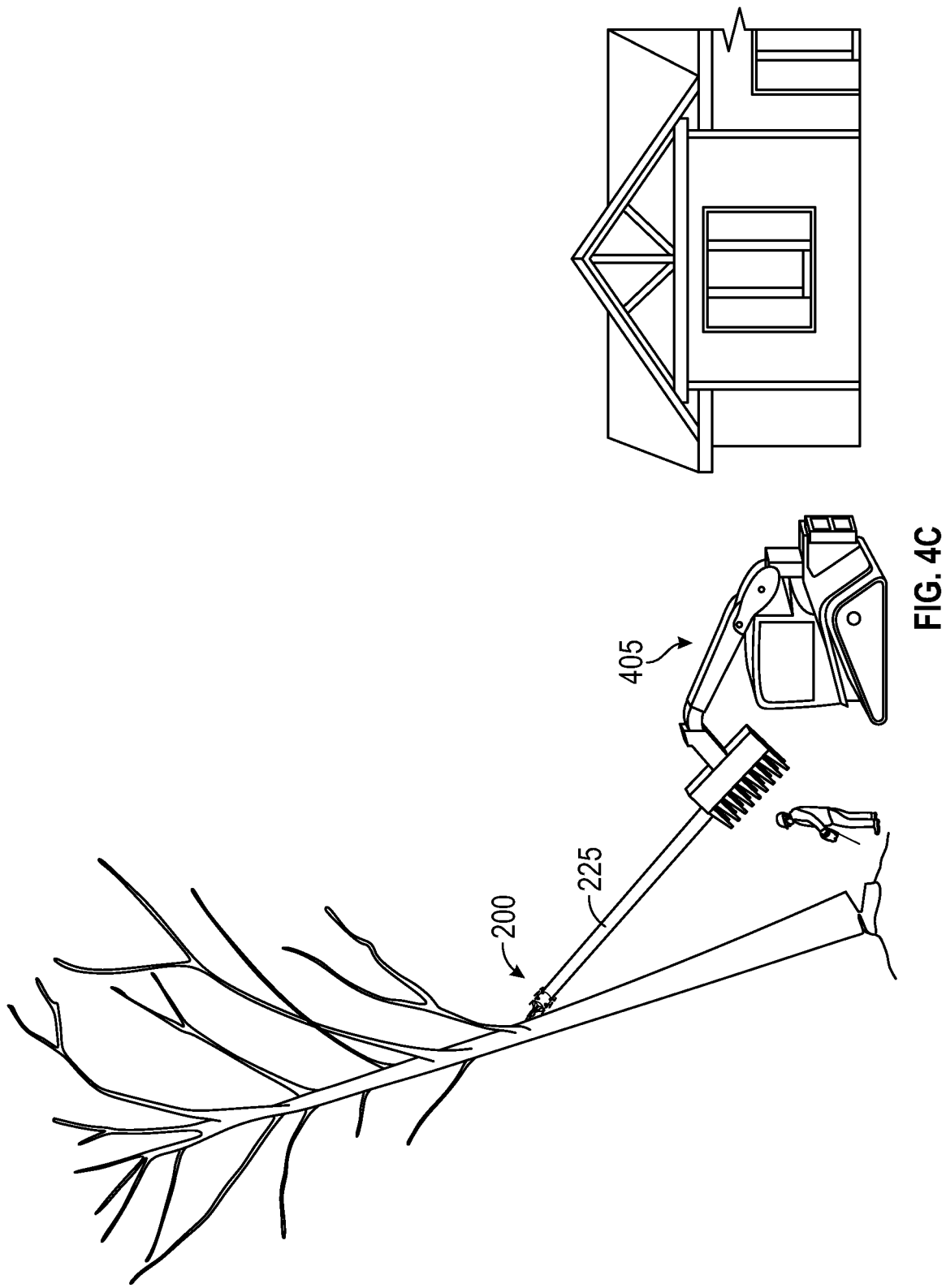

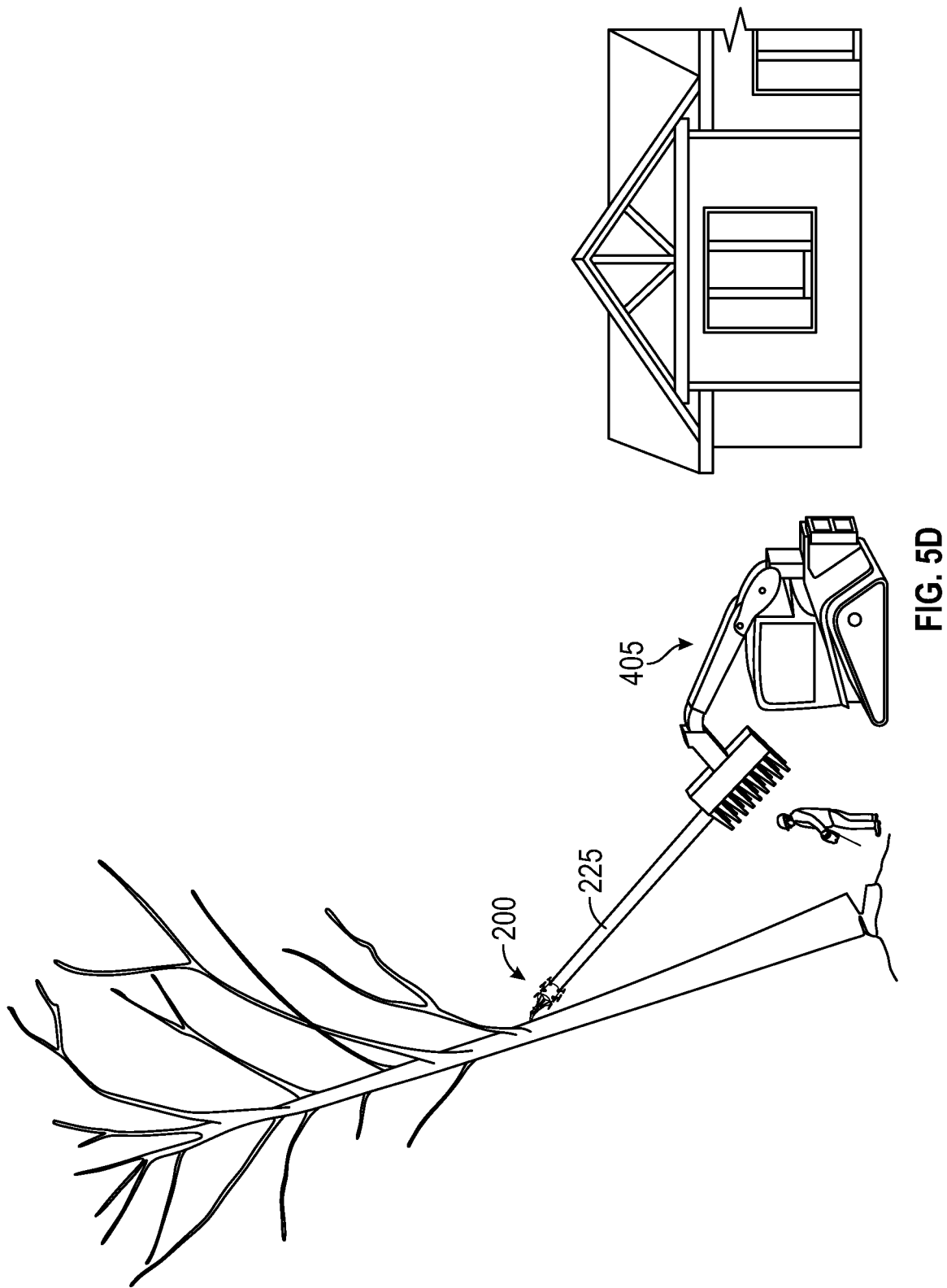

TREE PUSHER ADAPTER DEVICE

BACKGROUND OF THE INVENTION

Technical Field

The present invention relates to machine-assisted tree felling solutions and, more particularly, to a novel device for converting a log or pole to a tree felling assistance implement that can be leveraged by heavy equipment.

Prior Art

Arborists, tree removal and pruning services, departments of transportation (DOT), public and private utilities, and right-of-way (ROW) contractors (hereinafter referred to as "arborist crews") employ a wide variety of "best practice" felling procedures and techniques in order to safely and efficiently fell trees. As can be attested to by any cautious chainsaw novice who has contemplated how to go about felling a tree bigger than a volunteer sapling, a lot of training, know-how, and experience is the stock in trade of a professional. In addition to various and complicated felling cut techniques, professionals may use wedges, hydraulic jack arrangements, rope and tie-off systems, and/or even surrounding trees to cause a given tree to be felled right where the professional wants it. Factors such as the size and species of the tree, slope of the ground, weight distribution of the tree's canopy, prevailing wind direction, surrounding obstacles, and worker safety concerns all contribute to a professional's selected approach to felling.

Some of the nuances and hazards of tree felling can be avoided by using articulated loaders, skid steers, and other machines to urge or push the tree in the desired fell direction. Consequently, professional arborist crews commonly make use of articulated loaders, skid steers, and other machines to simply push a tree over or apply a force that, in conjunction with a felling cut at the tree's base, reliably fells the tree without the time and complication of other techniques.

Not surprisingly, when heavy equipment, such as for example articulated loaders, skid steers, and other machines, is available to assist in tree felling, professionals generally want to make use of it. However, most such heavy equipment is not optimally designed for assisting in tree felling activities. Therefore, there is a need in the art for a device or implement that may be used with a piece of heavy equipment, such as for example articulated loaders, skid steers, and other machines, to make such heavy equipment better suited and more efficient for tree felling. More specifically, there is a need in the art for a novel device that converts a log or pole to a tree felling assistance implement that can be used by for example articulated loaders, skid steers, and other machines.

BRIEF SUMMARY OF THE INVENTION

Exemplary embodiments of a device for use in a machine-assisted tree felling activity are disclosed. Certain embodiments are configured to be detachably mounted to a pole or a log. It is envisioned that a first tree of an optimal diameter may be cut on site, delimbed, and sectioned into a log of optimal length for use with the device. Once mounted to the end of the log, a heavy equipment such as for example articulated loaders, skid steers, and other machines may use the log to engage a second tree targeted for felling.

The device mounted to the end of the log may include any number of implements configured for engaging the target tree to be felled in such a way that the implement will not "slip" up the tree or off the tree, thereby giving the operator of the heavy equipment some level of control over the target tree. In some applications, the operator of the heavy equipment may simply use the device to push the target tree over such that the root ball of the target tree rises up out of the ground as the target tree is felled. In other applications, an operator may make cuts to the target tree before the heavy equipment pushes the tree with the device implement in the desired direction of fell.

An exemplary embodiment of a device for machine-assisted tree felling according to the solution comprises (1) a base component defining an internal cavity accessible from a first end of the base component, wherein the internal cavity is configured to receive an end of a log; (2) one or more ports in a wall of the base component configured to receive one or more anchor components, wherein the one or more anchor components are operable to secure the base component to the end of the log; (3) a receiver component extending from a second end of the base component, wherein the receiver component is configured to removably receive an implement; and (4) an implement removably received into the receiver component. Advantageously, the log may hit an end of the base component of the device—i.e., it butts up against the end firmly such that the anchor components (e.g., set screws) just keep the device on the log while the pushing force is transferred from the log to the end of the device to the implement. And so, when a log is received into the internal cavity of the base and the one or more anchor components secure the base to the log, the log may be used by a heavy equipment to engage a tree with the implement and apply a directional force to the tree.

The base component may optimally be in the shape of a cylinder or a cuboid with an open end and a closed end, however, other shapes are envisioned and within the scope of the solution. The wall of the base component may have a thickness in the range of ⅛" to ½", optimally in a range of 3/16" to ⅜". The one or more ports in the wall of the base component may comprise threads such that the one or more anchor components may take the form of a threaded set screw. However, it is envisioned that other embodiments may comprise a pair of aligned complementary ports (on opposite sides of the base component) such that an anchor component in the form of a pin or bolt may be extended through the pair of complementary ports via a bore in the log. In either embodiment, the log may be inserted into the open end of the base component such that it abuts, and seats to, the closed end of the base component. In this way, force supplied by heavy equipment utilizing the device may be efficiently transferred through the log to the device without undue stress on the anchor components.

The implement removably mounted in the receiver component may take the form of a single pointed tip, a curved head tip, or an L-shaped head tip; however, other implement forms are envisioned and within the scope of the solution. Depending on the particular embodiment, the implement tip may be substantially in line with a central axis of the receiver component or may be set at an angle relative to the central axis of the receiver component. Additionally, depending on embodiment, the implement tip may comprise a plurality of teeth, or other mechanical feature, operable to improve engagement with a tree such that slippage or rotation of the tree is mitigated. Among other improvements, the invention provides a device and method for allowing a user to control the felling of a tree by engaging the implement tip in the tree whereby the tree can be better directed while being felled. Also among other improvements, the invention provides a device and method for allowing a user to reach a tree by selecting an appropriate length pole (tree) on which to mount the device while allowing the user and the machinery operated by the user to remain a safe or required distance from the tree to be felled.

BRIEF DESCRIPTION OF THE DRAWINGS

FIGS. 4A, 4B and 4C collectively illustrate an exemplary application by a skid steer of the embodiment of the solution illustrated in FIG. 3;

FIGS. 5B, 5C and 5D collectively illustrate an exemplary application by a skid steer of the embodiment of the solution illustrated in FIG. 5A;

DETAILED DESCRIPTION OF PREFERRED EMBODIMENTS

Various embodiments, aspects and features of the present invention encompass a device that converts a log or pole to a tree felling assistance implement that can be used by a skid steer or other equipment.

In this description, the terms "articulated loader and/or skid steer" refers to a given type of equipment commonly used by arborists, DOT crews, and ROW maintenance crews. Generally, an articulated loader or skid steer is a motorized piece of equipment with an articulated arm or the like. Some articulated loaders and skid steers are tracked and some are wheeled. It is envisioned that a skid steer may be particularly suited for leveraging embodiments of the solution in a machine-assisted tree felling application; even so, use of the term "skid steer" in this description, and illustration of a skid steer in certain of the figures, will not suggest that embodiments of the solution may only be used by motorized equipment specifically in the form of a skid steer. That is, it is envisioned that embodiments of the solution may be leveraged in a machine-assisted tree felling application by any type of motorized equipment configured therefor.

In general, and as will become clearer from the figures and the description that follows, embodiments of the solution encompass a device that converts a log or pole into a tree felling assistance implement. The device may be received by, and removably fixed onto, the end of a pole or log and then used by a skid steer grasping the log to apply a directional force to a tree ready for felling. Advantageously, in some applications, an embodiment of the solution affixed to the end of a suitably long pole or log may be used by a skid steer to simply push a tree over and out of the ground. In such application, the pole may be long enough to enable the skid steer to use the novel device to push over a tree such that the root ball of the tree rises out of the ground without being impeded by the skid steer.

As will become more apparent from the figures and description that follows, embodiments of the solution may be configured to receive a pole/log until the pole/log is inserted fully and firmly against the end of a base aspect. That is, the invention may be "seated" onto the end of a pole/log and secured in place via one or more screws that are tightened to secure the invention on to the pole/log.

Figure 1:
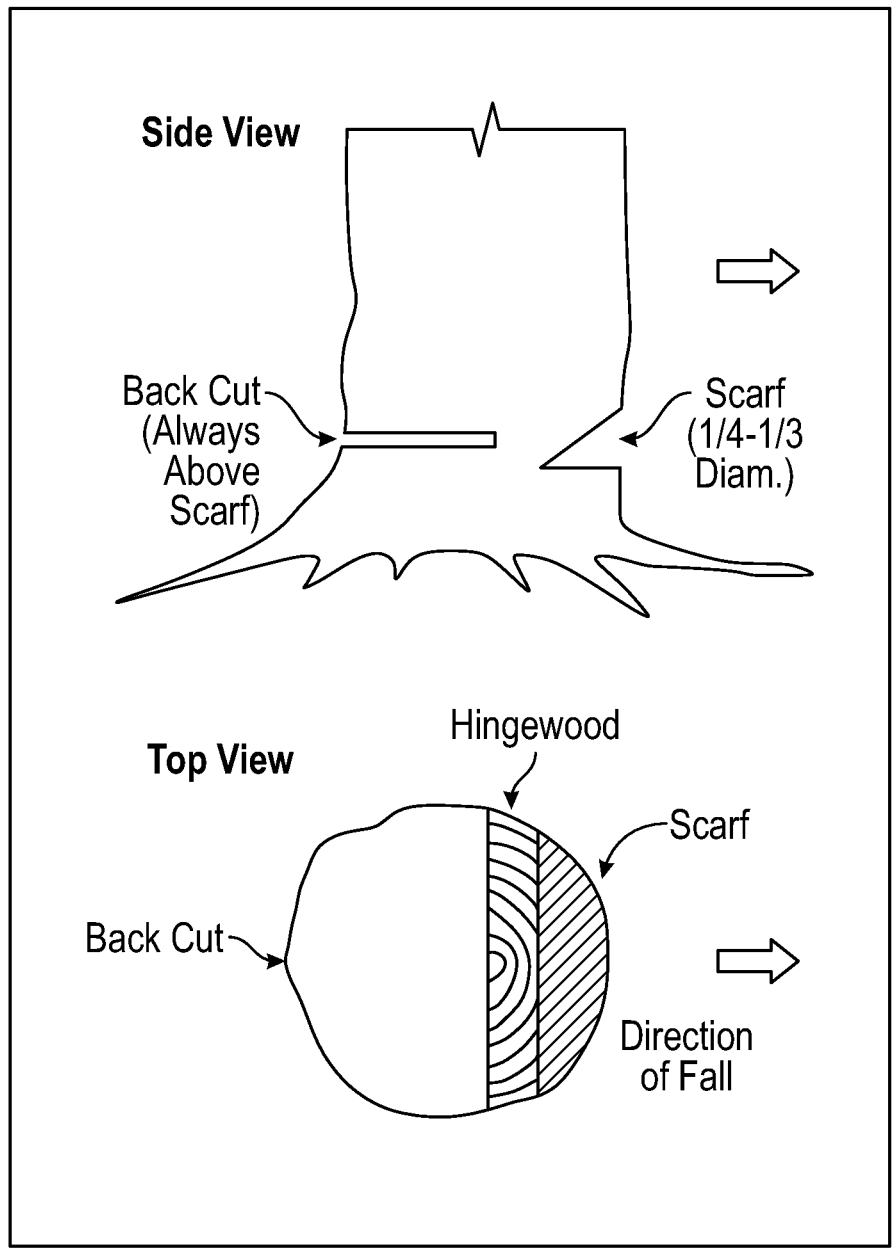
FIG. 1 illustrates a basic felling cut technique.

FIG. 1 illustrates a basic felling cut technique. Variations of the basic felling cut technique shown in the FIG. 1 illustration, as well as alternative felling cut techniques, are known and understood by those of skill in the art. The FIG. 1 illustration is provided for the benefit of the reader and is not intended to suggest, nor does it suggest, that embodiments of the solution may only be used in tree felling applications that apply the basic felling cut technique or, for that matter, any felling cut technique at all.

As can be understood from the FIG. 1 illustration, a triangular scarf cut may be made near the base of a tree to be felled. The scarf cut is made on the side of the tree associated with the desired direction of fell. Once the scarf cut is made, a chainsaw operator may move to the opposite side of the tree and make a horizontal back cut. As depicted in the FIG. 1 illustration, the back cut is made at a level that is above the lowest plane of the scarf cut and at a depth that leaves a volume of hinge wood uncut.

Ideally, once the back cut is made the tree will fall in the direction of the scarf cut. In application, however, miscalculations on fell cut technique selection, canopy weight distribution, wind direction, etc. may result in a tree that does not fell predictably and, so, operators may desire to use heavy equipment, such as a skid steer, to assist in the felling process by applying a force that ensures the tree will fall as desired in the direction of the scarf.

Figure 2A:
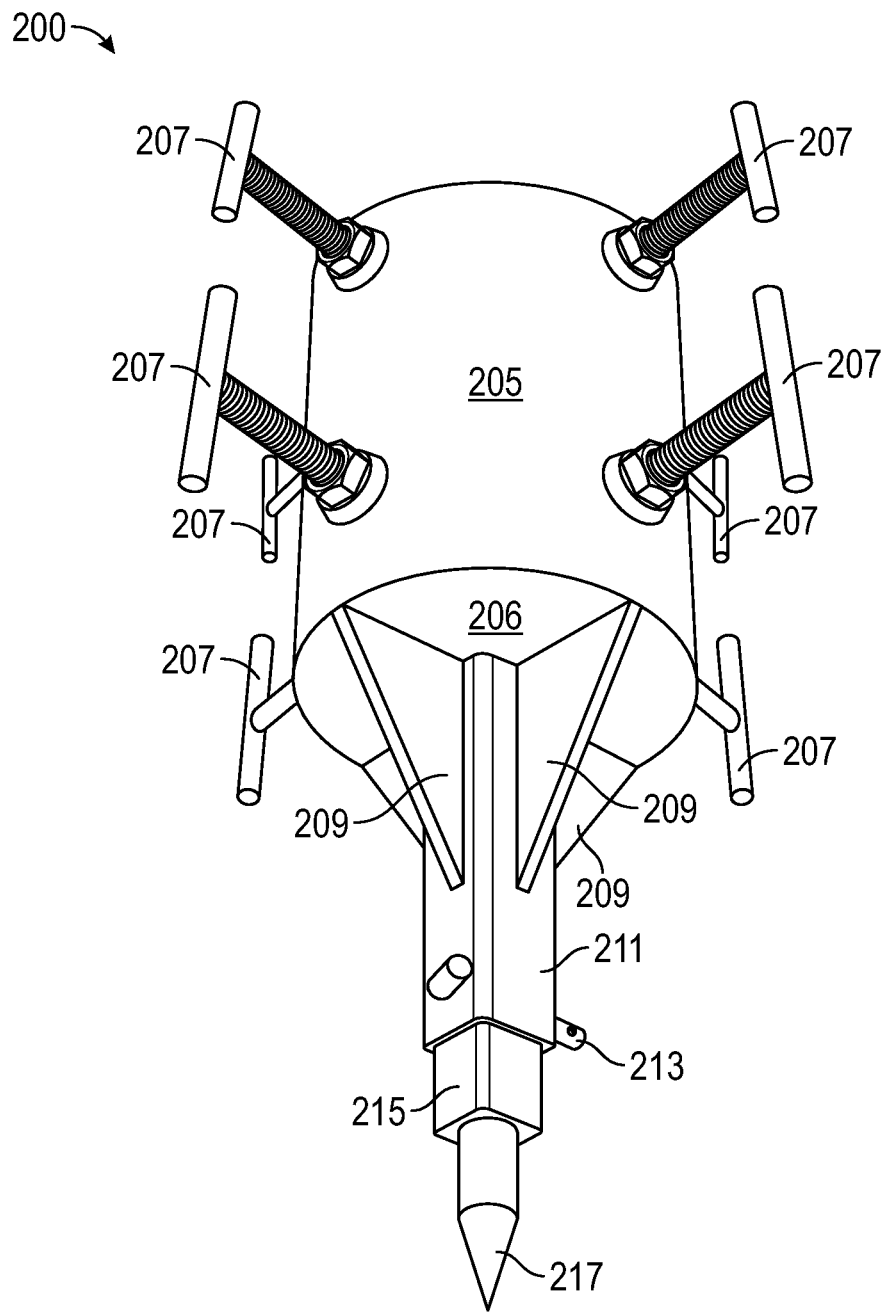
FIG. 2A is a first perspective view of an exemplary embodiment according to the solution for a device that converts a log or pole to a tree felling assistance implement, shown with a straight set, pointed tip implement.
Figure 3:
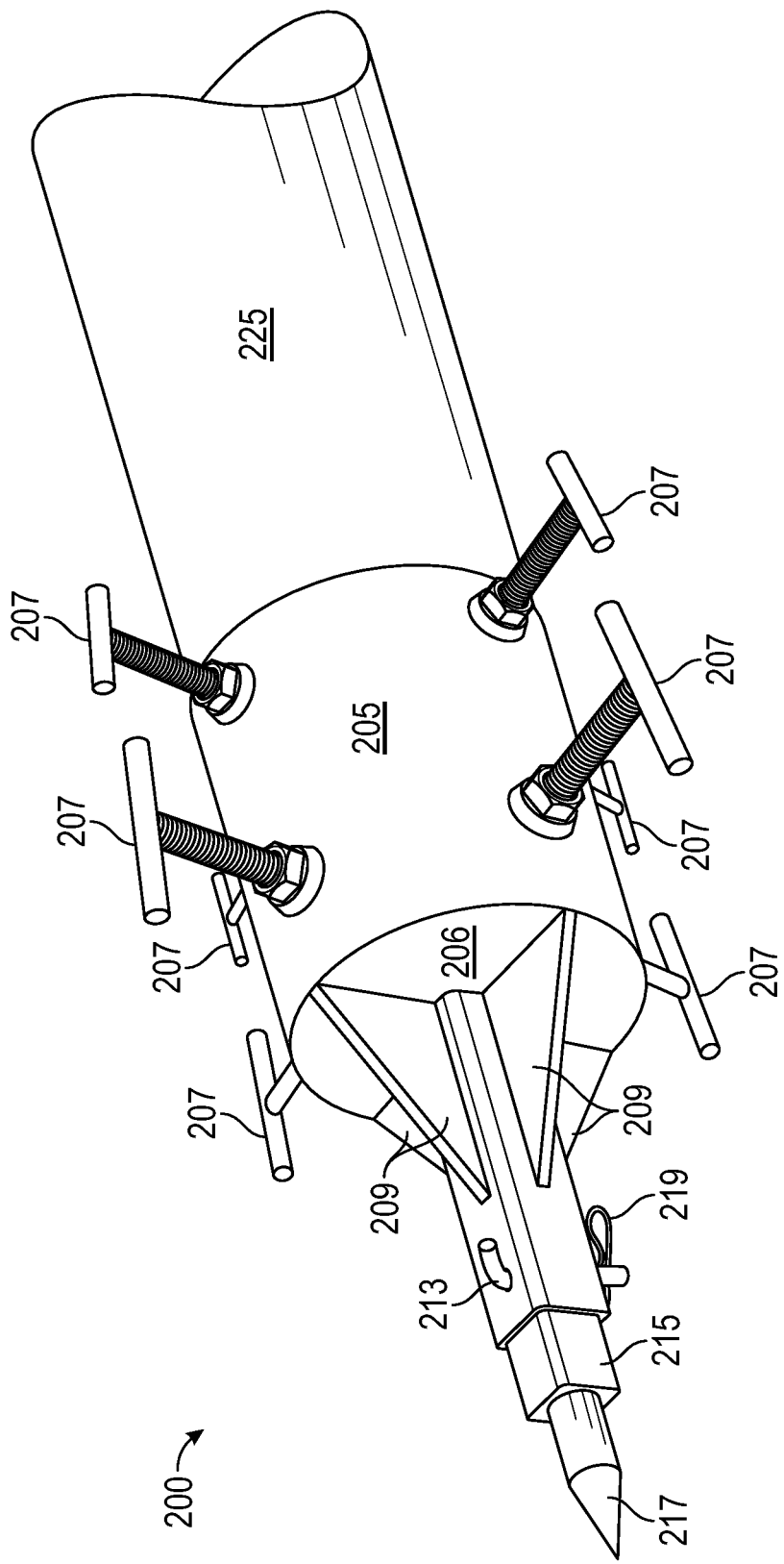
FIG. 3 is a perspective view of the exemplary embodiment of the solution illustrated in FIGS. 2A-2C, shown mounted to a log or pole.

FIG. 2A is a first perspective view of an exemplary embodiment 200 according to the solution for a device that converts a log or pole into a tree felling assistance implement, shown with a straight set, pointed tip implement 217. As will become clearer with the FIG. 3 illustration, cylindrical body 205 may be configured to receive a pole or log such that an end of the pole/log seats or abuts the interior surface of end wall 206. Notably, although the body 205 shown in the exemplary embodiment is cylindrical in shape, it is envisioned that other body shapes, such as a square body shape for example, may be used in other embodiments without departing from the scope of the solution.

Returning to the FIG. 2A illustration, the cylindrical body 205 includes threaded ports for receiving a plurality of set screws 207. The set screws 207 may include handles or other means for tightening the screws into a pole or log received into the body 205. Notably, although the exemplary embodiment shown in the figure includes eight set screws 207, it is envisioned that other embodiments within the scope of the solution may have more or fewer than eight set screws 207. Moreover, it is envisioned that alternative embodiments within the scope of the solution may use means other than set screws to anchor the device 200 to a pole or log such as, but not limited to, a pin or bolt inserted simultaneously through complementary ports in the body of the device and a bore through the log or pole.

Figure 2B:
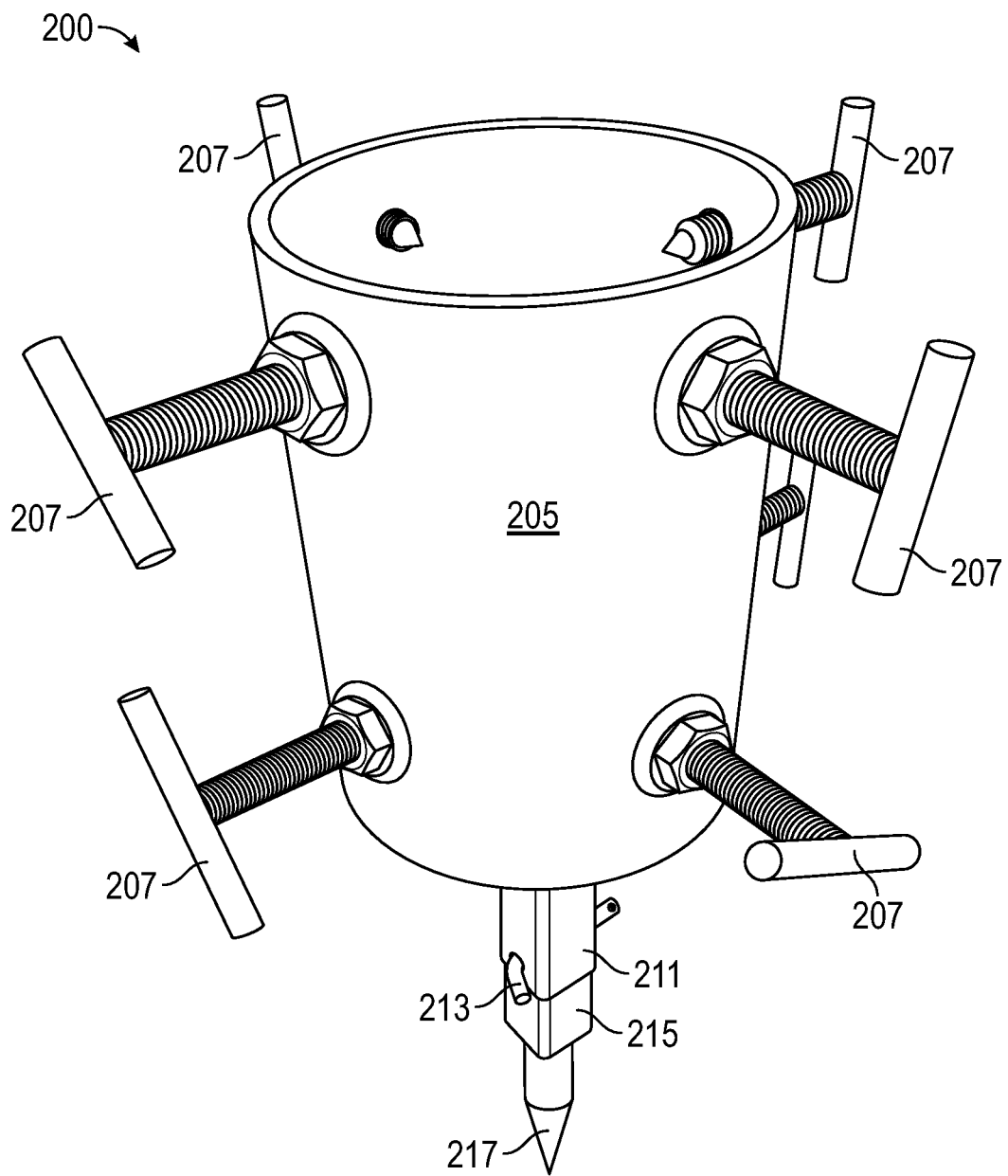
FIG. 2B is a second perspective view of the exemplary embodiment illustrated in FIG. 2A.
Figure 2C:
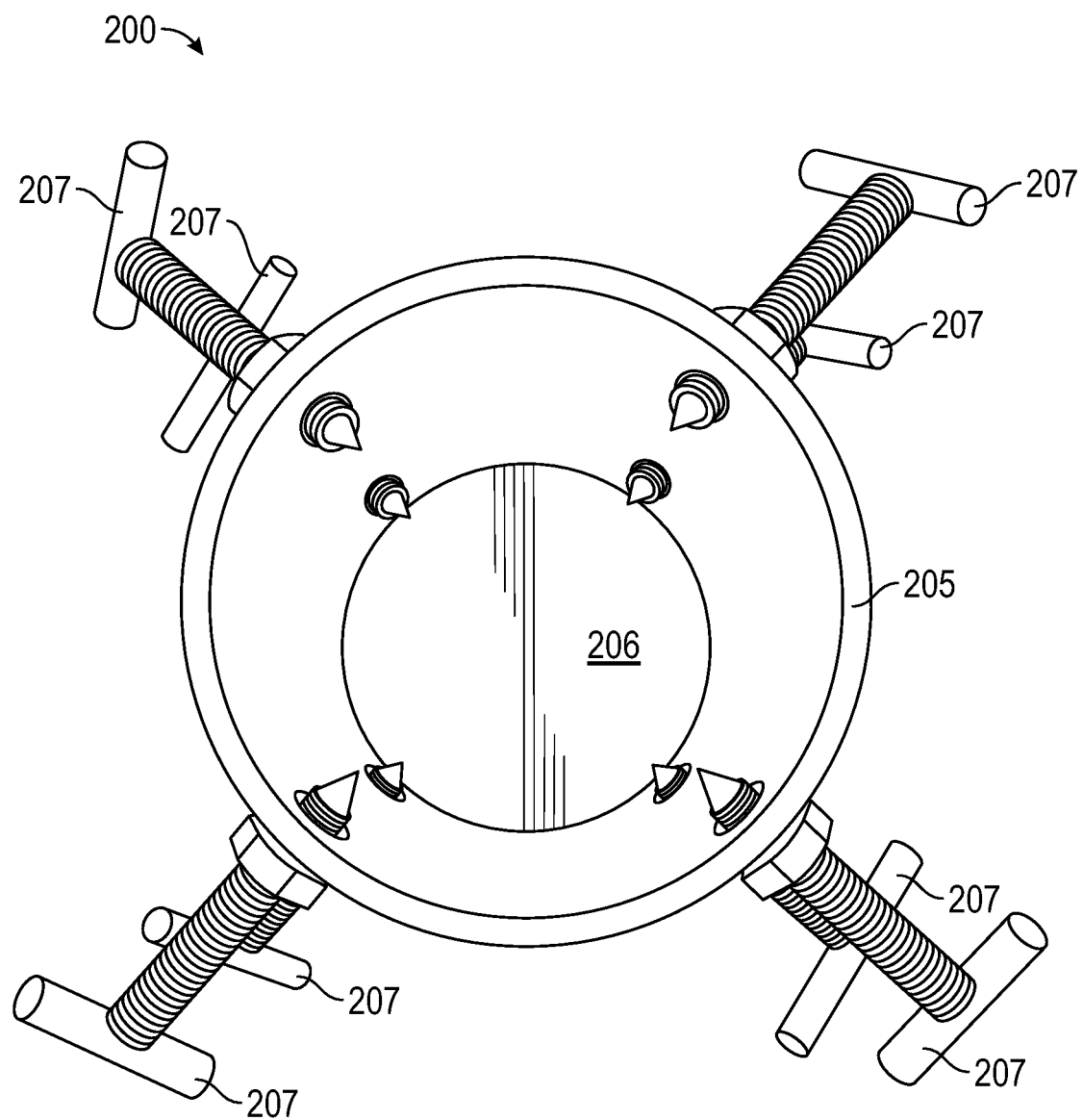
FIG. 2C is a top view of the exemplary embodiment illustrated in FIG. 2A.

As can be understood from the figures, a first end of the body 205 is configured for receiving a log or pole (see FIG. 2C illustration). The pole or log may be and preferably is inserted until fully received and abutted to end wall 206. Extending from the outer surface of end wall 206 may be a receiver component 211. The receiver component 211 may be similar to a tow hitch receiver, as would be understood by one of ordinary skill in the art of tow hitches. In the exemplary embodiment shown in the FIG. 2A illustration, the receiver component 211 comprises a square tube that is structurally secured to the end wall 206 via a plurality of triangular gussets 209. Inserted into the receiver component 211 is an implement 215 that includes a pointed tip 217 set substantially in line with a center line of the receiver component 211. The implement 215 is secured in the receiver component 211 via a pin 213 that extends simultaneously through the receiver component 211 and the implement 215.

FIG. 2B is a second perspective view of the exemplary embodiment 200 illustrated in FIG. 2A and, similarly, FIG. 2C is a top view of the exemplary embodiment illustrated in FIG. 2A. In the FIG. 2B and FIG. 2C illustrations, certain ones of set screws 207 can be seen extending through body 205 and into the inner cavity defined by cylindrical body 205. As would be understood by one of ordinary skill in the art, in this way the set screws 207 may be tightened into a log or pole inserted into the inner cavity of body 205.

FIG. 3 is a perspective view of the exemplary embodiment 200 of the solution illustrated in FIGS. 2A-2C, shown mounted to a log or pole 225. As can be understood from the FIG. 3 illustration, a log or pole 225 has been received into the inner cavity of cylindrical body 205 and abutted to end wall 206. The set screws 207 may have been tightened into the pole 225 such that the device 200 is mechanically secured to the pole 225 and is unlikely to accidentally disengage from the pole 225. A cotter pin 219 has been inserted through pin 213 to prevent pin 213 from accidentally disengaging from receiver component 211 such that implement 215 is no longer secured.

Figure 4A:
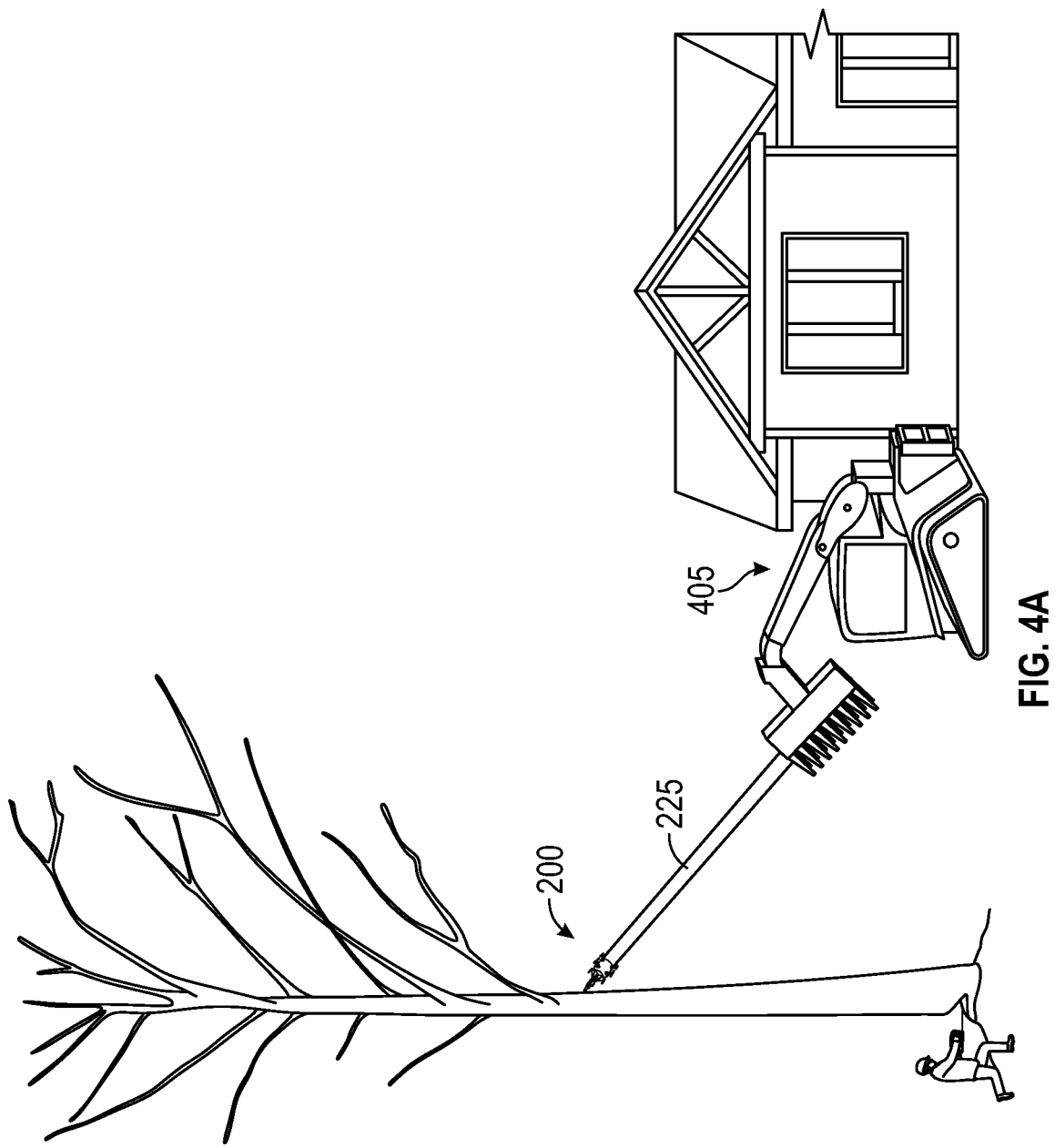
Figure 4B:
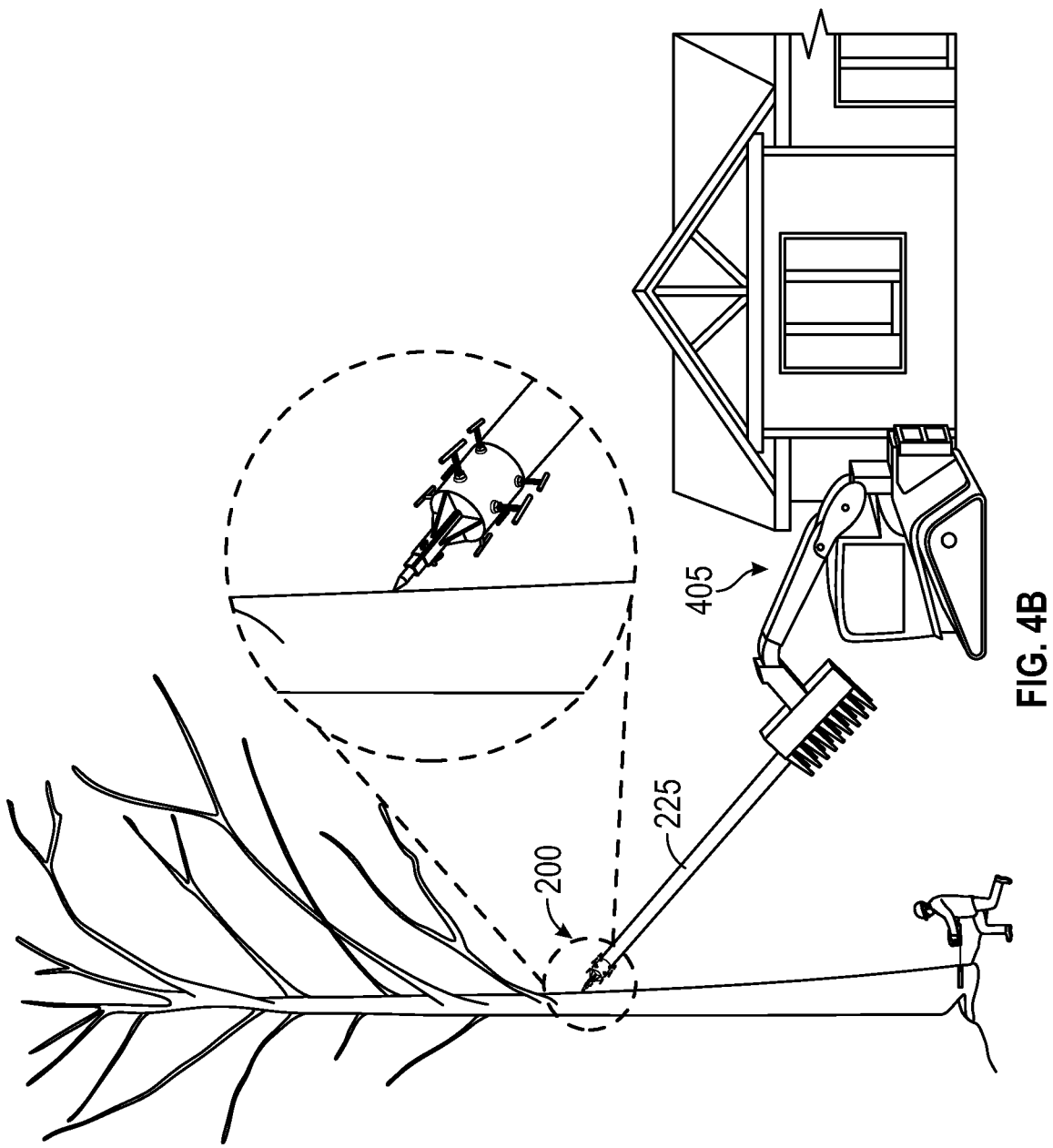

FIGS. 4A, 4B and 4C collectively illustrate an exemplary application by a skid steer 405 of the embodiment 200 of the solution illustrated in FIG. 3. As previously shown and described, the exemplary device 200 is mechanically secured to a log or pole 225. The log or pole 225 may be grasped by skid steer 405, as would be understood by one of ordinary skill in the art of skid steers and similar heavy equipment. With the pole 225 grasped, the skid steer 225 may engage a tree with the implement 215. In the example, the implement 215 includes a straight set pointed tip 217 that may be forced into the body of the tree in order to mitigate any chance that the tree rotates off of the implement 215 and out of control of the skid steer 405.

With the implement 215 engaged with the tree, an operator may make a scarf cut near the base of the tree (FIG. 4A). Once the scarf cut is completed, the operator may move to the back of the tree and make the back cut (FIG. 4B). Once the back cut is made, the operator may safely move away from the tree as the skid steer 405 is advanced forward (whether by articulation of its arm or by rotation of its tracks/wheels) to apply a force in the direction of the desired fell (FIG. 4C).

Figure 5A:
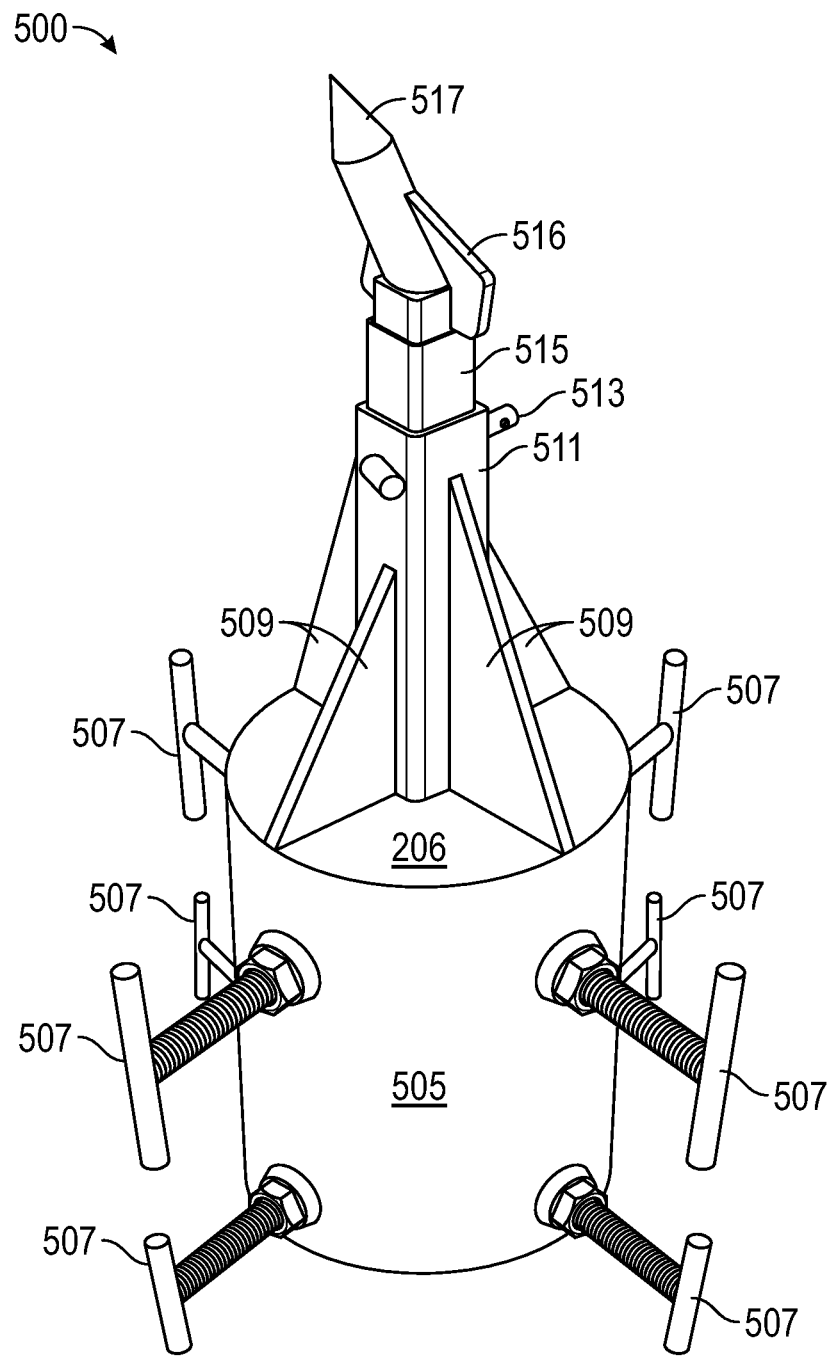
FIG. 5A illustrates an alternative exemplary embodiment of the solution for a device that converts a log or pole to a tree felling assistance implement, shown with an angle set, pointed tip implement.

FIG. 5A illustrates an alternative exemplary embodiment 500 of the solution for a device that converts a log or pole 225 to a tree felling assistance implement, shown with an angle set, pointed tip 517. It is envisioned that an angle set tip 517 may be advantageous when using the device 500 to engage a tree targeted for felling due to the angled tip being less likely to disengage from the tree as it is felled.

Similar to that which has been previously shown and described, cylindrical body 505 may be configured to receive a pole or log. Notably, although the body 505 shown in the exemplary embodiment is cylindrical in shape, it is envisioned that other body shapes, such as a square body shape for example, may be used in other embodiments without departing from the scope of the solution.

Returning to the FIG. 5A illustration, the cylindrical body 505 includes threaded ports for receiving a plurality of set screws 507. The set screws 507 may include handles or other means for tightening the screws into a pole or log received into the body 505 and abutted to end wall 206. Notably, although the exemplary embodiment shown in the figure includes eight set screws 507, it is envisioned that other embodiments within the scope of the solution may have more or fewer than eight set screws 507. Moreover, it is envisioned that alternative embodiments within the scope of the solution may use means other than set screws to anchor the device 500 to a pole or log such as, but not limited to, a pin or bolt inserted simultaneously through the body of the device and a bore through the log or pole.

As can be understood from the figures, a first end of the body 505 is configured for receiving a log or pole (see previous FIG. 2C illustration). Extending from the end of the body 505 that is distal to the end configured for receiving a pole or log may be a receiver component 511. The receiver component 511 may be similar to a tow hitch receiver, as would be understood by one of ordinary skill in the art of tow hitches. In the exemplary embodiment shown in the FIG. 5A illustration, the receiver component 511 comprises a square tube that is structurally secured to the body 505 via a plurality of triangular gussets 509. Notably, the triangular gussets 509 may vary in height such that one or more of the gussets 509 extend substantially the length of the receiver 511 in order to maximize structural rigidity of the device 500. Two of the triangular gussets are shorter on opposite sides of the square tube receiver component 511 to allow space for the pins to hold the selected implement. The receiver 511 can be a standard square receiver, such as but not limited to a 2" trailer hitch receiver, and the pin is a standard pin for holding an insert within the receiver, such as but not limited to a hitch ball.

Inserted into the receiver component 511 is an implement 515 that includes a pointed tip 517 set at an angle relative to a center axis line of the receiver component 511. Additional reinforcement brackets 516 may be included in order to lend structural rigidity to the angle set pointed tip 517. The implement 515 is secured in the receiver component 511 via a pin 513 that extends simultaneously through the receiver component 511 and the implement 515.

Figure 5B:
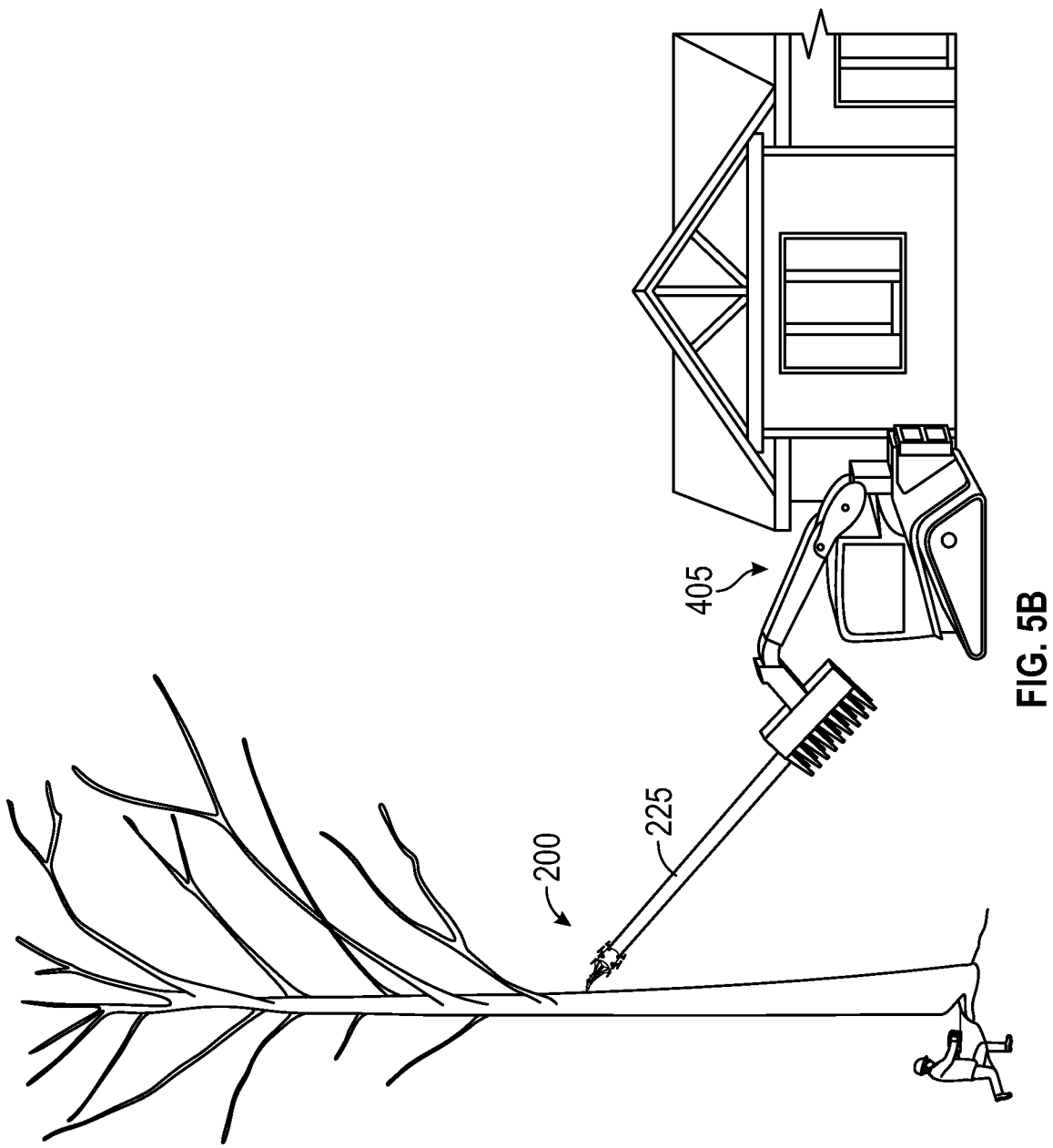
Figure 5C:
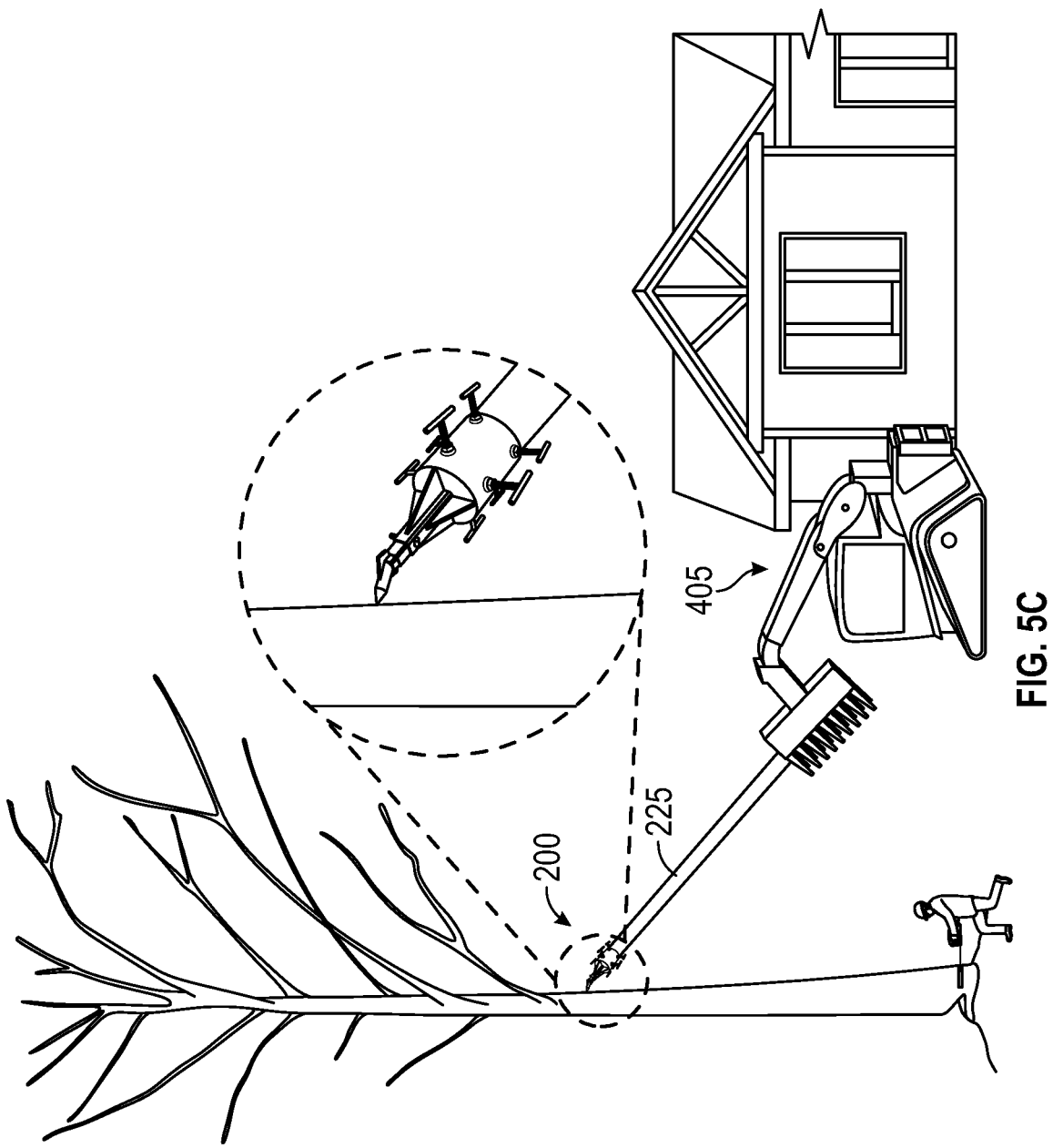

FIGS. 5B, 5C and 5D collectively illustrate an exemplary application by a skid steer 405 of the embodiment of the solution 500 illustrated in FIG. 5A. As previously shown and described, the exemplary device 200 is mechanically secured to a log or pole 225. The log or pole 225 may be grasped by skid steer 405, as would be understood by one of ordinary skill in the art of skid steers and similar heavy equipment. With the pole 225 grasped, the skid steer 225 may engage a tree with the implement 515. In the example, the implement 515 includes an angle set, pointed tip 517 that may be forced into the body of the tree in order to mitigate any chance that the tree rotates off of the implement 515 and out of control of the skid steer 405, or that the pointed tip 517 slides along the body of the tree. For example, as discussed below in more detail, the use of a 45-degree angle, or an angle with the range of approximately 30- to 60-degrees, for the pointed tip allows for a better securing of the tip within the tree body.

With the implement 515 engaged with the tree, an operator may make a scarf cut near the base of the tree (FIG. 5B). Once the scarf cut is completed, the operator may move to the back of the tree and make the back cut (FIG. 5C). Once the back cut is made, the operator may safely move away from the tree as the skid steer 405 is advanced forward (whether by articulation of its arm or by rotation of its tracks/wheels) to apply a force in the direction of the desired fell (FIG. 5D).

Advantageously, as opposed to a straight set tip on an implement, it is envisioned that angled tips (such as angle set, pointed tip 517) will not (or are less likely to) slip out or disengage from the tree as the tree is pushed. Briefly referring back to the close-up view in the FIG. 4B illustration, it can be seen that the straight set tip 217 is already at a 45-degree angle to the tree before the tree begins to fell. With the angle tip, such as angle set, pointed tip 517, the tip will initially engage the tree at approximately a 90-degree angle (see close-up on FIG. 5C) and, as such, enable an operator of the skid steer to keep engagement with the tree longer through the felling process.

Figure 6:
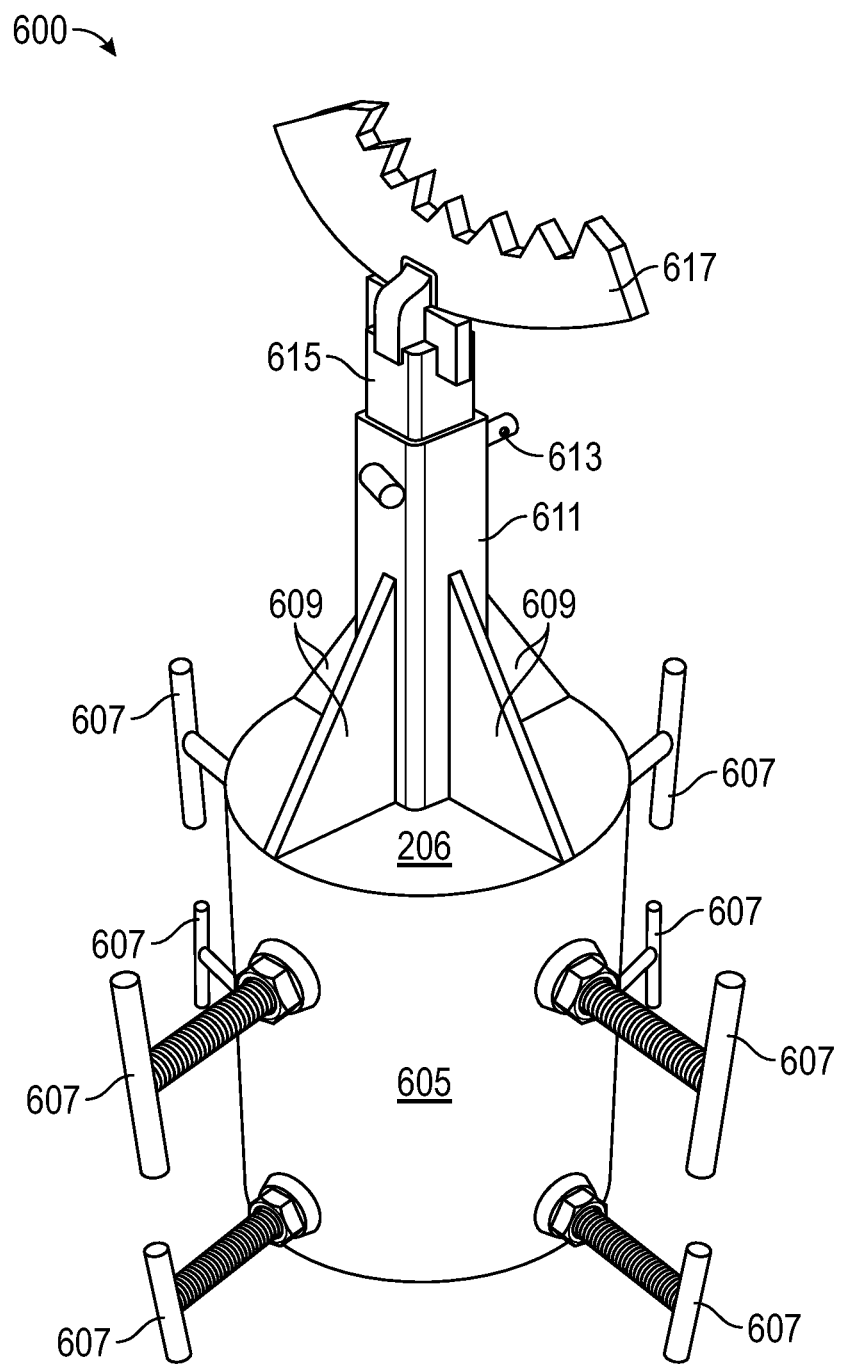
FIG. 6 illustrates an alternative exemplary embodiment of the solution for a device that converts a log or pole to a tree felling assistance implement, shown with a straight set, curved head implement.

FIG. 6 illustrates an alternative exemplary embodiment 600 of the solution for a device that converts a log or pole to a tree felling assistance implement, shown with a straight set, curved head tip 617 to implement 615. The exemplary curved head tip 617 is shown to include teeth for engaging a tree, however, it is envisioned that other embodiments may not include teeth. The curved head tip 617 may be well suited for safely and securely engaging a tree targeted for felling in such a way that rotation or twisting of the tree away from the curved head tip 617 and out of control by the skid steer may be mitigated.

Similar to that which has been previously shown and described, cylindrical body 605 may be configured to receive a pole or log. Notably, although the body 605 shown in the exemplary embodiment is cylindrical in shape, it is envisioned that other body shapes, such as a square body shape for example, may be used in other embodiments without departing from the scope of the solution.

Returning to the FIG. 6 illustration, the cylindrical body 605 includes threaded ports for receiving a plurality of set screws 607. The set screws 607 may include handles or other means for tightening the screws into a pole or log received into the body 605. Notably, although the exemplary embodiment shown in the figure includes eight set screws 607, it is envisioned that other embodiments within the scope of the solution may have more or fewer than eight set screws 607. Moreover, it is envisioned that alternative embodiments within the scope of the solution may use means other than set screws to anchor the device 600 to a pole or log such as, but not limited to, a pin or bolt inserted simultaneously through the body of the device and a bore through the log or pole.

As can be understood from the figures, a first end of the body 605 is configured for receiving a log or pole (see previous FIG. 2C illustration). Extending from the end wall 206 may be a receiver component 611. The receiver component 611 may be similar to a tow hitch receiver, as would be understood by one of ordinary skill in the art of tow hitches. In the exemplary embodiment shown in the FIG. 6 illustration, the receiver component 611 comprises a square tube that is structurally secured to the body 605 via a plurality of triangular gussets 609. Notably, although not illustrated as such in FIG. 6, the triangular gussets 609 may vary in height such that one or more of the gussets 609 extend substantially the length of the receiver 611 in order to maximize structural rigidity of the device 600 (see FIGS. 5A and 7A, for example).

Inserted into the receiver component 611 is an implement 615 that includes a curved head tip 617 set substantially in line with a center line axis of the receiver component 611. The implement 615 is secured in the receiver component 611 via a pin 613 that extends simultaneously through the receiver component 611 and the implement 615.

Figure 7A:
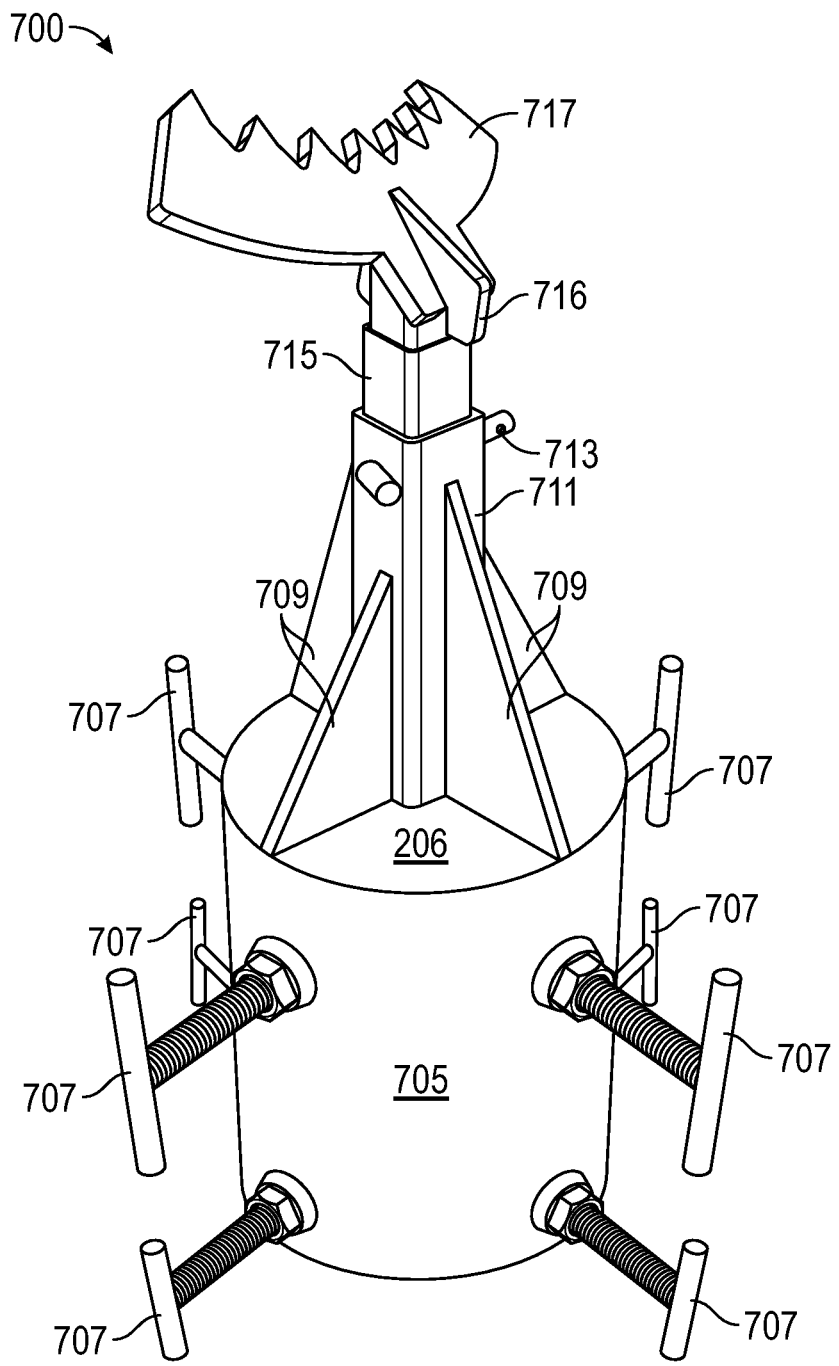
FIG. 7A illustrates an alternative exemplary embodiment of the solution for a device that converts a log or pole to a tree felling assistance implement, shown with an angle set, curved head implement.

FIG. 7A illustrates an alternative exemplary embodiment of the solution for a device 700 that converts a log or pole to a tree felling assistance implement, shown with an angle set, curved head tip 717 implement. It is envisioned that an angle set curved head tip 717 may be advantageous when using the device 700 to engage a tree targeted for felling. The exemplary curved head tip 717 is shown to include teeth for engaging a tree; however, it is envisioned that other embodiments may not include teeth. The curved head tip 717 may be well suited for safely and securely engaging a tree targeted for felling in such a way that rotation or twisting of the tree away from the curved head tip 717 and out of control by the skid steer may be mitigated.

A curved tip implement, such as angle set, curved head tip 717 may be ideal for use on relatively smaller trees as it is envisioned that the tip may fit around the circumference of the tree and thereby engage the tree without too much need for a skid steer operator to be as precise in driving the skid steer. In this way, it is envisioned that implements with a pointed tip may be better suited for use on larger trees as the size of a curved head tip configured for large trees might be unwieldy or unnecessary. Advantageously, operators may change out tips in the field as necessary for engagement with given trees to be felled.

Returning to the FIG. 7A illustration, similar to that which has been previously shown and described, cylindrical body 705 may be configured to receive a pole or log until it abuts an interior surface defined by end wall 206. Notably, although the body 705 shown in the exemplary embodiment is cylindrical in shape, it is envisioned that other body shapes, such as a square body shape for example, may be used in other embodiments without departing from the scope of the solution.

The cylindrical body 705 includes threaded ports for receiving a plurality of set screws 707. The set screws 707 may include handles or other means for tightening the screws into a pole or log received into the body 705. Notably, although the exemplary embodiment shown in the figure includes eight set screws 707, it is envisioned that other embodiments within the scope of the solution may have more or fewer than eight set screws 707. Moreover, it is envisioned that alternative embodiments within the scope of the solution may use means other than set screws to anchor the device 700 to a pole or log such as, but not limited to, a pin or bolt inserted simultaneously through the body of the device and a bore through the log or pole.

As can be understood from the figures, a first end of the body 705 is configured for receiving a log or pole (see previous FIG. 2C illustration). Extending from the end of the body 705 that is distal to the end configured for receiving a pole or log may be a receiver component 711. The receiver component 711 may be similar to a tow hitch receiver, as would be understood by one of ordinary skill in the art of tow hitches. In the exemplary embodiment shown in the FIG. 7 illustration, the receiver component 711 comprises a square tube that is structurally secured to the body 705 via a plurality of triangular gussets 709. Notably, the triangular gussets 709 may vary in height such that one or more of the gussets 709 extend substantially the length of the receiver 711 in order to maximize structural rigidity of the device 700.

Inserted into the receiver component 711 is an implement 715 that includes a curved head tip 717 set at an angle relative to a center axis line of the receiver component 711. Additional reinforcement brackets 716 may be included in order to lend structural rigidity to the angle set curved head tip 717. The implement 715 is secured in the receiver component 711 via a pin 713 that extends simultaneously through the receiver component 711 and the implement 715. The implement 715 is secured in the receiver component 711 via a pin 713 that extends simultaneously through the receiver component 711 and the implement 715.

Figure 7B:
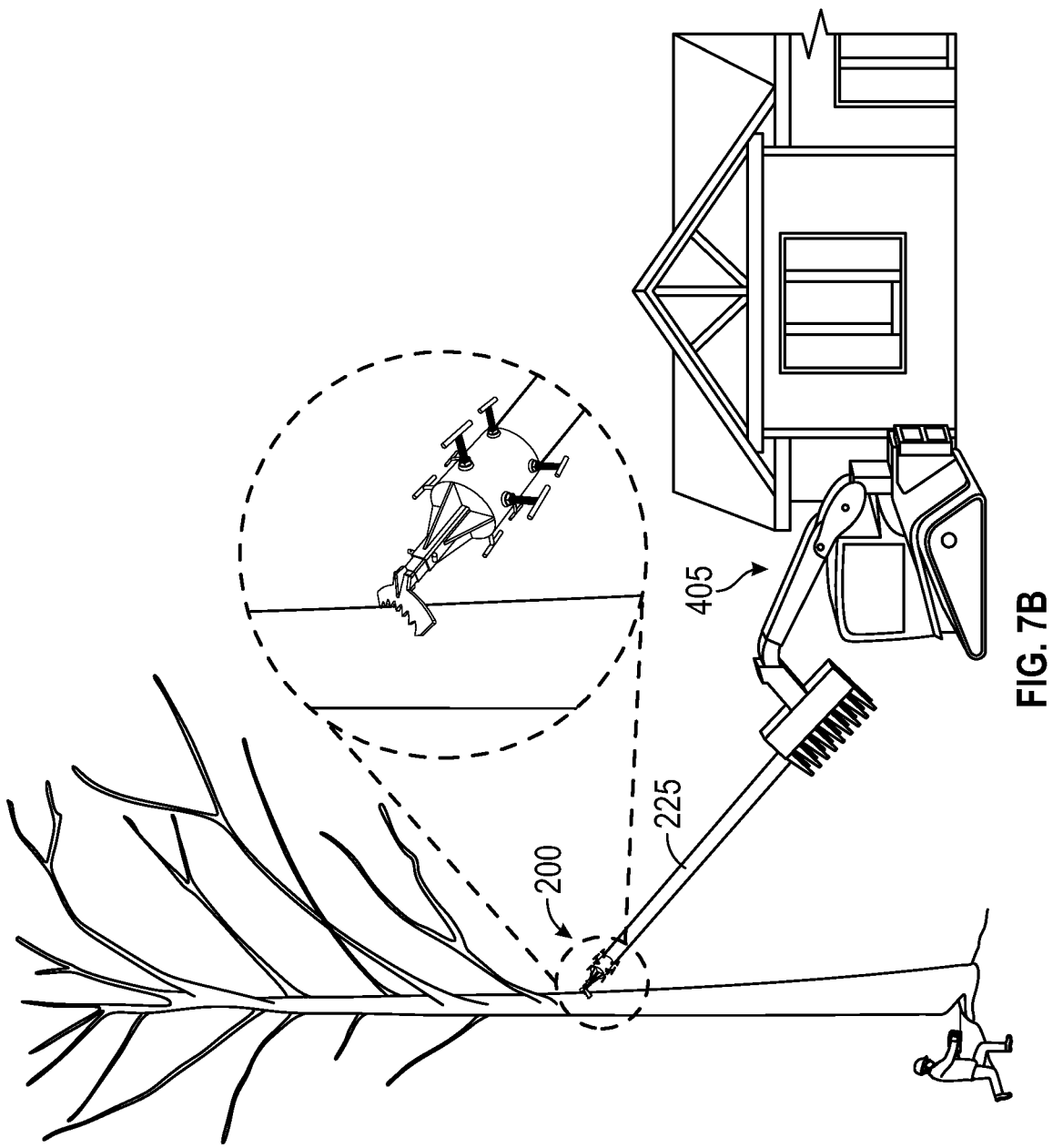
FIG. 7B illustrates an exemplary application by a skid steer of the embodiment of the solution illustrated in FIG. 7A.

FIG. 7B illustrates an exemplary application by a skid steer of the embodiment 700 of the solution illustrated in FIG. 7A. As can be understood especially from the close-up view in the FIG. 7B illustration, the curved head tip 717 engages partially around the circumference of the tree. In this way, the curved head tip 717 provides an operator with increased engagement of the tree, thereby giving the operator more control against twisting or rotating of the tree during the felling process. Moreover, because the curved head tip 717 is set at an angle, the tip 717 may advantageously stay engaged with the tree relatively longer throughout the felling process, as described above relative to the FIG. 5C illustration.

Figure 8:
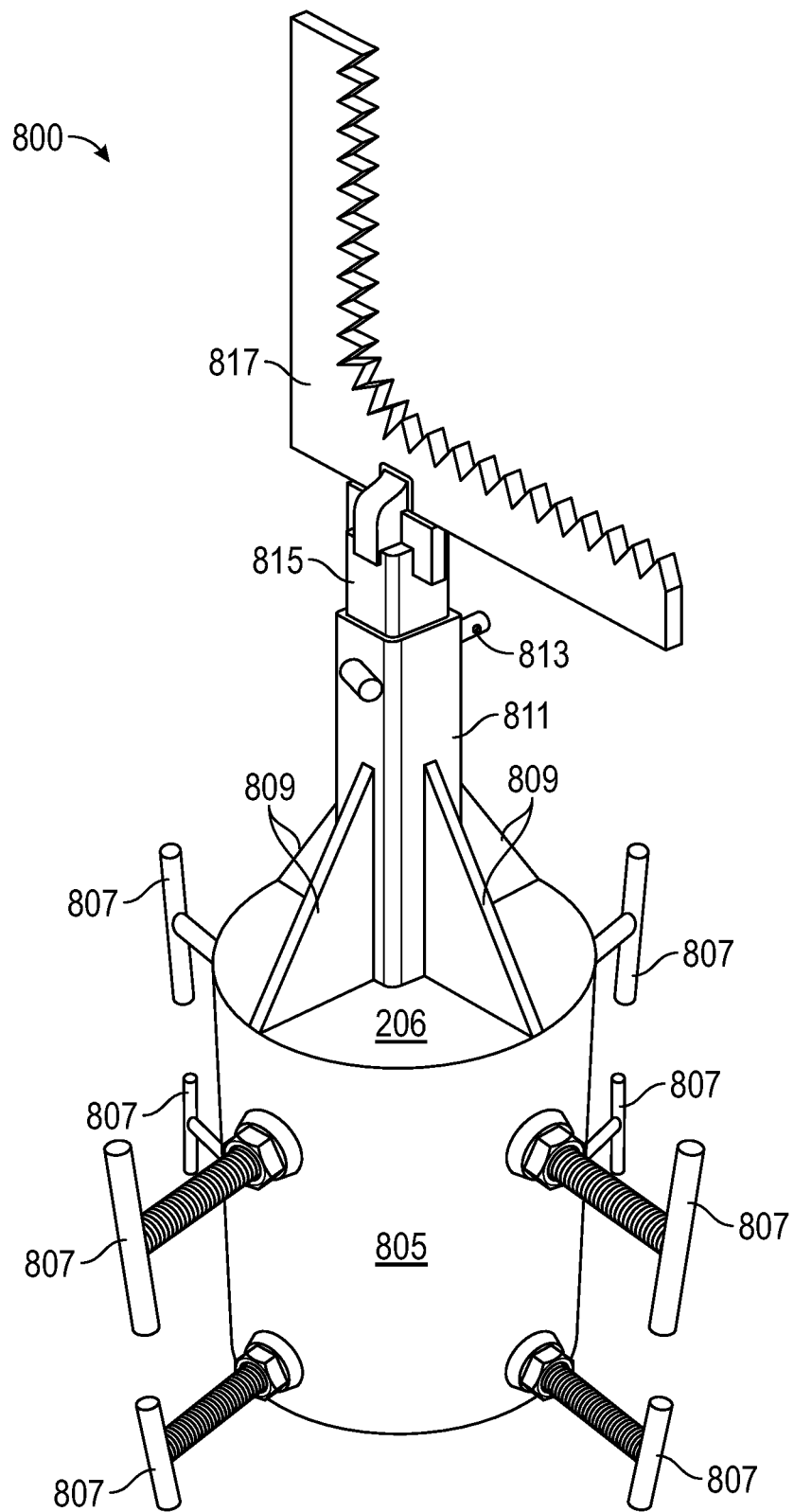
FIG. 8 illustrates an alternative exemplary embodiment of the solution for a device that converts a log or pole to a tree felling assistance implement, shown with a straight set, L-shaped head implement.

FIG. 8 illustrates an alternative exemplary embodiment of the solution for a device 800 that converts a log or pole to a tree felling assistance implement, shown with a straight set, L-shaped head 817. The exemplary L-shaped head tip 817 is shown to include teeth for engaging a tree; however, it is envisioned that other embodiments may not include teeth. The L-shaped head tip 817 may be well suited for safely and securely engaging a tree targeted for felling in such a way that the tree may be felled in a direction that is at an angle to the orientation of the skid steer. An explanation of how the L-shaped head tip 817 may be leveraged when the skid steer is unable to align itself with the desired direction of fell will be illustrated in FIGS. 9A-9C.

Similar to that which has been previously shown and described, cylindrical body 805 may be configured to receive a pole or log until it abuts or seats against an interior surface defined by end wall 206. Notably, although the body 805 shown in the exemplary embodiment is cylindrical in shape, it is envisioned that other body shapes, such as a square body shape for example, may be used in other embodiments without departing from the scope of the solution.

Returning to the FIG. 8 illustration, the cylindrical body 805 includes threaded ports for receiving a plurality of set screws 807. The set screws 807 may include handles or other means for tightening the screws into a pole or log received into the body 805. Notably, although the exemplary embodiment shown in the figure includes eight set screws 807, it is envisioned that other embodiments within the scope of the solution may have more or fewer than eight set screws 807. Moreover, it is envisioned that alternative embodiments within the scope of the solution may use means other than set screws to anchor the device 800 to a pole or log such as, but not limited to, a pin or bolt inserted simultaneously through the body of the device and a bore through the log or pole.

As can be understood from the figures, a first end of the body 805 is configured for receiving a log or pole (see previous FIG. 2C illustration). Extending from the end of the body 805 that is distal to the end configured for receiving a pole or log may be a receiver component 811. The receiver component 811 may be similar to a tow hitch receiver, as would be understood by one of ordinary skill in the art of tow hitches. In the exemplary embodiment shown in the FIG. 8 illustration, the receiver component 811 comprises a square tube that is structurally secured to the body 805 via a plurality of triangular gussets 809. Notably, although not illustrated as such in FIG. 8, the triangular gussets 809 may vary in height such that one or more of the gussets 809 extend substantially the length of the receiver 811 in order to maximize structural rigidity of the device 800 (see FIG. 5, for example).

Inserted into the receiver component 811 is an implement 815 that includes an L-shaped head tip 817 set substantially in line with a center line axis of the receiver component 811. The implement 815 is secured in the receiver component 811 via a pin 813 that extends simultaneously through the receiver component 811 and the implement 815.

Figure 9A:
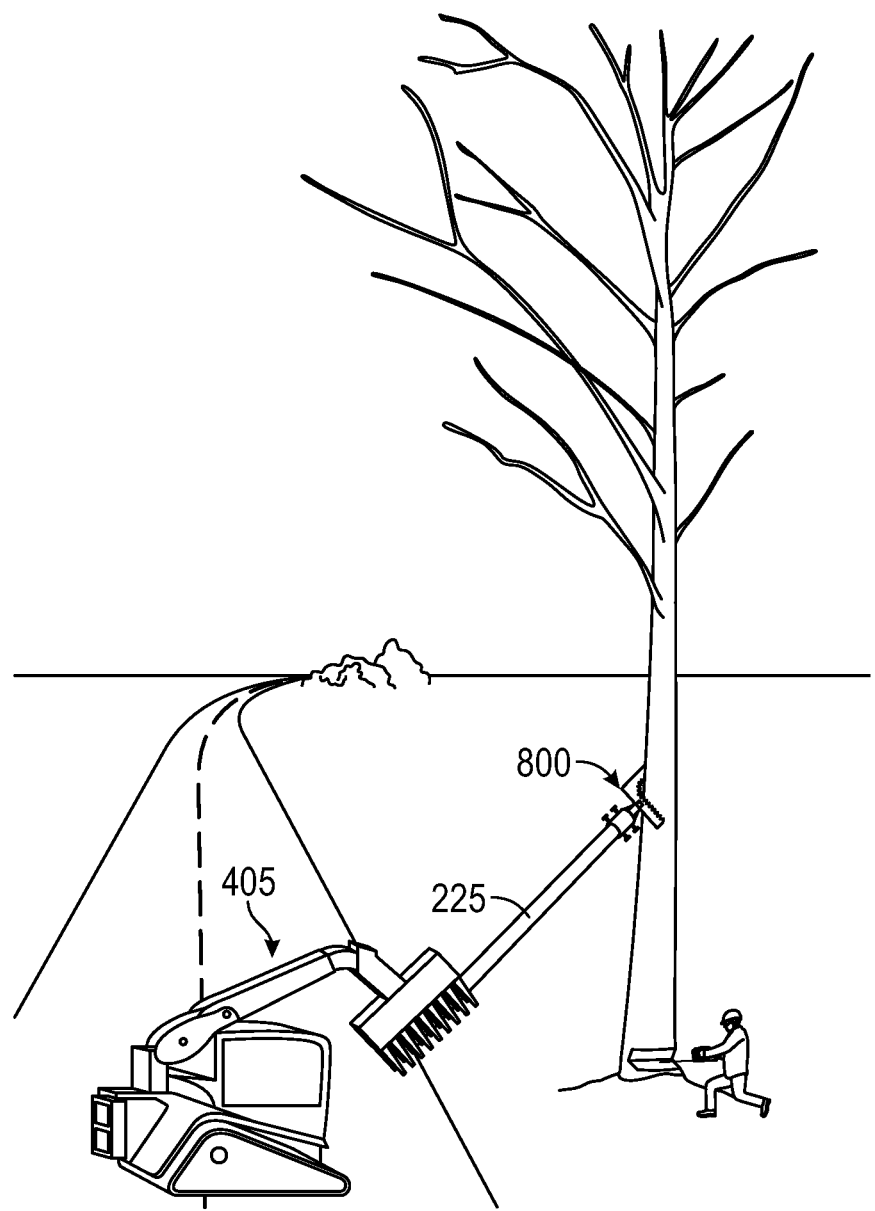
FIGS. 9A, 9B and 9C collectively illustrate an exemplary application by a skid steer of the embodiment of the solution illustrated in FIG. 8.
Figure 9B:
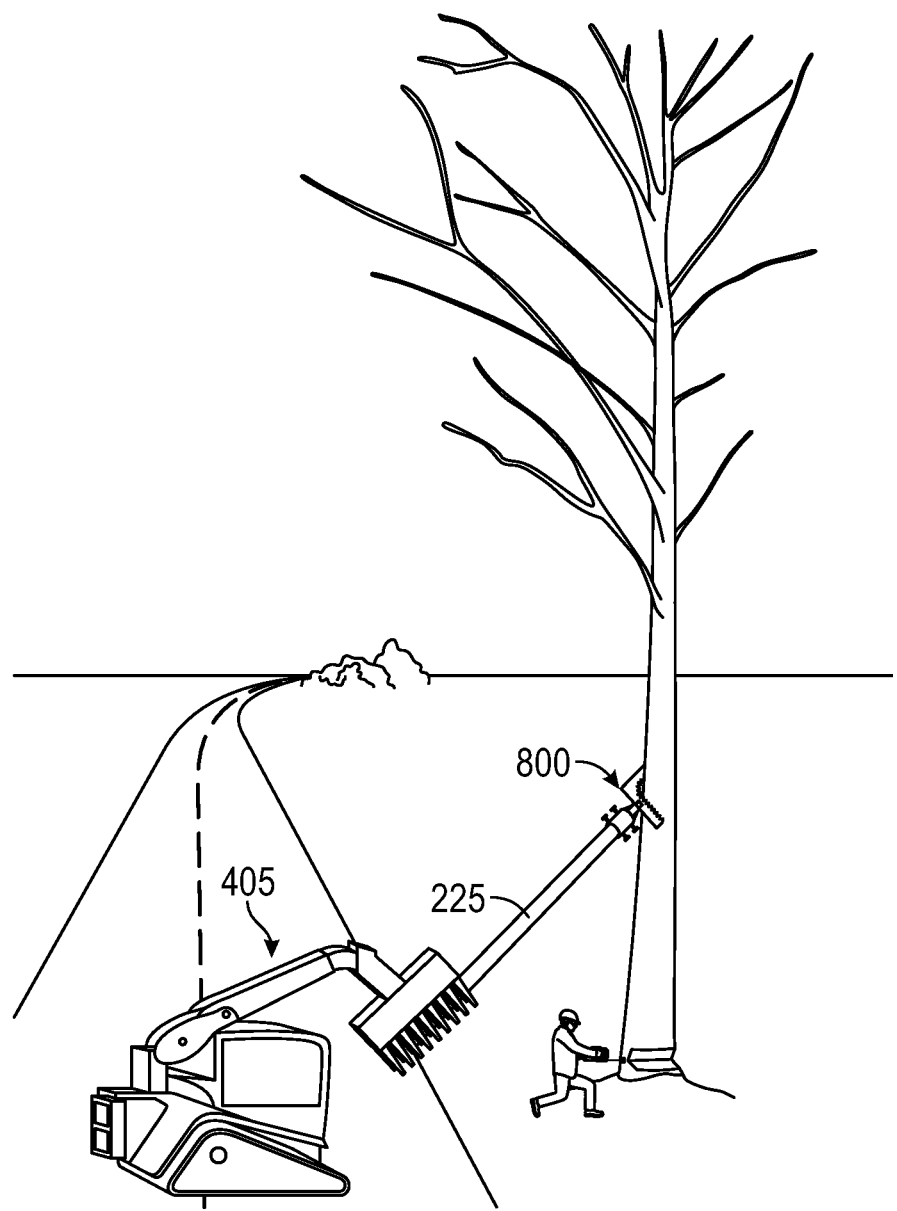
Figure 9C:
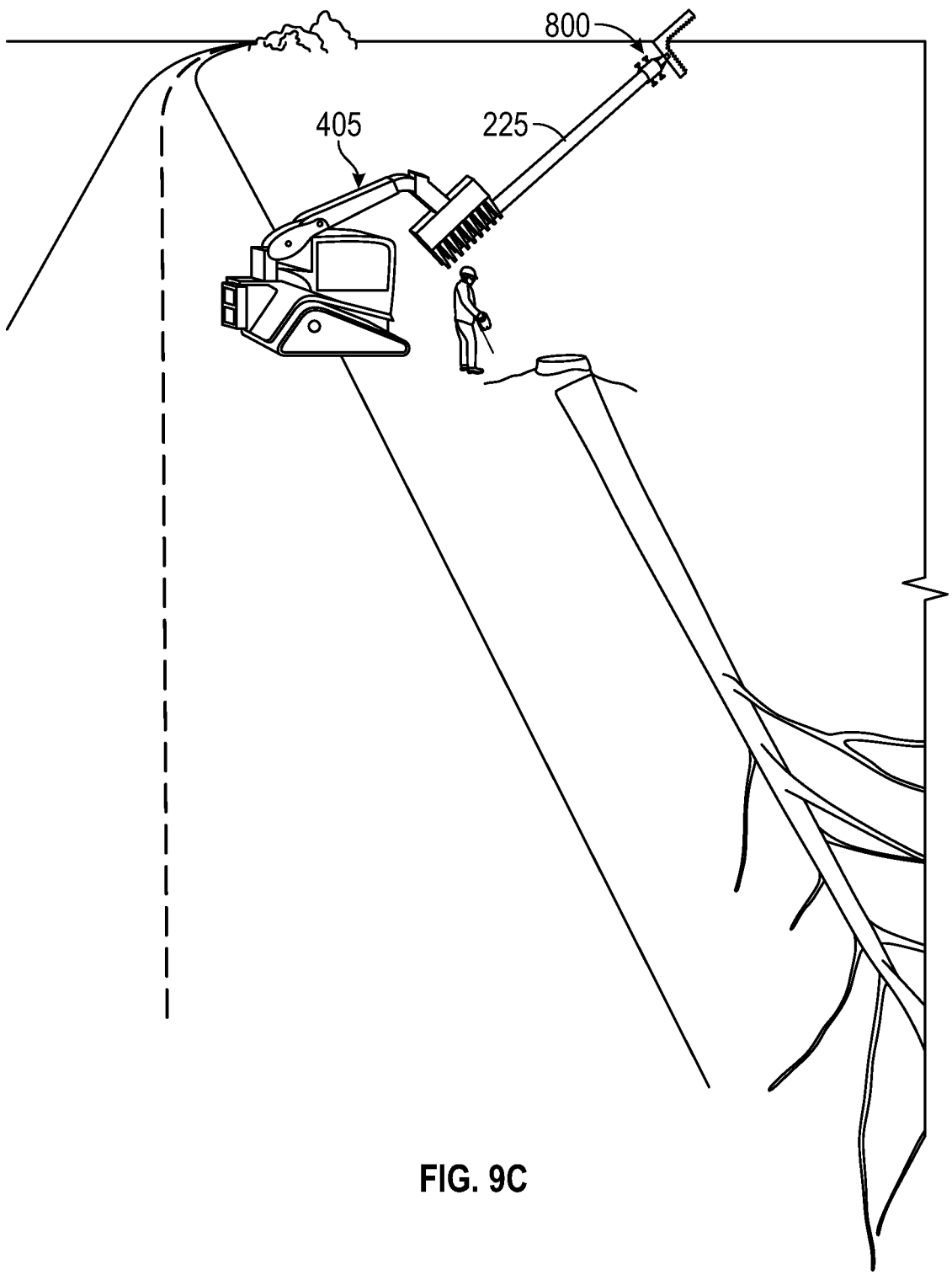

FIGS. 9A, 9B and 9C collectively illustrate an exemplary application by a skid steer of the embodiment of the solution illustrated in FIG. 8. In the FIG. 9 illustrations, the tree targeted for felling is located along the side of a road and the desired direction of fell is parallel to the road. Notably, the skid steer 405 is unable to position itself directly in line with the desired direction of fell while staying on the road and so it engages the tree at an angle to the desired direction of fell. Advantageously, the L-shaped tip 817 of implement 815 allows for engagement of the tree even though the skid steer is unable to position itself in line with the desired fell direction (as was shown and described in the FIG. 4 illustrations).

As previously shown and described, the exemplary device 800 is mechanically secured to a log or pole 225 by inserting the log or pole 225 until it abuts an interior surface defined by end wall 206 and tightening set screws or the like. The log or pole 225 may be grasped by skid steer 405, as would be understood by one of ordinary skill in the art of skid steers and similar heavy equipment. With the pole 225 grasped, the skid steer 225 may engage a tree with the implement 815. In the example, the implement 815 includes an L-shaped tip 817 that engages the tree even though the skid steer 405 remains on the road next to the tree.

With the implement 815 engaged with the tree, an operator may make a scarf cut near the base of the tree (FIG. 9A). Once the scarf cut is completed, the operator may move to the back of the tree and make the back cut (FIG. 9B). Once the back cut is made, the operator may safely move away from the tree as the skid steer 405 is advanced forward in a sharp turn (generally by rotation of its tracks/wheels) to apply a force in the direction of the desired fell (FIG. 9C). Advantageously, the tree may fall parallel to the road instead of perpendicular to the road or onto the road itself. The "L" shape of the tip used in the implement 800 retains the tree and prevents it from falling forward, backward, or in the direction of the elbow of the "L," but allows the tree to fall in the direction of the opening of the "L" opposite the elbow (in the example illustration, parallel to the road).

Thus, in certain embodiments of the invention, the implement 215, 515, 615, 715, 815 comprises a tip 217, 517, 617, 717, 817 substantially in line with a central axis of the receiver component 211, 511, 611, 711, 811, the tip 217, 517, 617, 717, 817 configured to engage a tree. In other embodiments of the invention, the implement 215, 515, 615, 715, 815 comprises a tip 217, 517, 617, 717, 817 set at an angle of between 30-degrees and 60-degrees relative to a central axis of the receiver component 211, 511, 611, 711, 811, the tip 217, 517, 617, 717, 817 configured to engage a tree. In still other embodiments of the invention, the implement 215, 515, 615, 715, 815 comprises a tip 217, 517, 617, 717, 817 set at an angle of between 40-degrees and 50-degrees relative to a central axis of the receiver component 211, 511, 611, 711, 811, the tip 217, 517, 617, 717, 817 configured to engage a tree. In yet other embodiments of the invention, the implement 215, 515, 615, 715, 815 comprises a tip 217, 517, 617, 717, 817 set at an angle of 45-degrees relative to a central axis of the receiver component 211, 511, 611, 711, 811, the tip 217, 517, 617, 717, 817 configured to engage a tree A device for machine-assisted tree felling according to the solution has been described using detailed descriptions of embodiments thereof that are provided by way of example and are not intended to limit the scope of the disclosure. The described embodiments comprise different features, not all of which are required in all embodiments of a device for machine-assisted tree felling according to the solution. Some embodiments of the solution utilize only some of the features or possible combinations of the features. Variations of embodiments of the solution that are described and embodiments of the solution comprising different combinations of features noted in the described embodiments will occur to persons of the art.

The invention also includes a method for pushing over trees to which a typical machine cannot access, comprising placing a device on a log; securing the device on the log with the log abutting the end of the device; attaching a selected insert on the device (point, arc, L); placing the insert against the tree at a point providing sufficient leverage for a controlled pushing of the tree, the point being higher on the tree than current methods, whereby the machine is a safe and desired distance from the tree such that the machine operator is also a safe and desired distance from the tree whereby the tree, when being felled, is unlikely to fall onto the machine or the machine operator; and pushing the tree in a desired direction, wherein the tree is felled in a safe manner in a desired direction.

Thus, among other improvements, the invention provides a device and method for allowing a user to control the felling of a tree by engaging the implement tip in the tree whereby the tree can be better directed while being felled. For example, the implement tip, when engaged with (forced into) the tree to be felled, allows for the user to better direct the tree in the desired felling direction. Also among other improvements, the invention provides a device and method for allowing a user to reach a tree by selecting an appropriate length pole (tree) on which to mount the device while allowing the user and the machinery operated by the user to remain a safe or required distance from the tree to be felled. For example, if safety or location circumstances require, a length of pole can be selected that allows the user and the machinery operated by the user to be a necessary or desired distance from the tree to be felled.

It will be appreciated by persons skilled in the art that a device and method for machine-assisted tree felling according to the solution is not limited by what has been particularly shown and described herein above. Rather, the scope of a device and method for machine-assisted tree felling according to the solution is defined by the claims that follow.

What is claimed is:

1. A device for machine-assisted tree felling, comprising:
a base component defining an internal cavity accessible from a first end of the base component, wherein the internal cavity is configured to receive an end of a log and abut the end of the log to an end wall aspect of the base component;
one or more ports in a wall of the base component configured to receive one or more anchor components, wherein the one or more anchor components are operable to secure the base component to the end of the log;
a receiver component extending from a second end of the base component, wherein the receiver component is configured to removably receive an implement; and
an implement removably received into the receiver component, the implement comprising a tip configured to engage a tree, wherein tip is set in the receiver component at an angle of between 30-degrees and 60-degrees relative to a central axis of the receiver component;
wherein when a log is received into the internal cavity of the base and the one or more anchor components secure the base to the log, the log may be used by a heavy equipment to engage a tree with the implement and apply a directional force to the tree.

2. The device of claim 1, wherein the base component is in the shape of one of a cylinder and a cuboid.

3. The device of claim 1, wherein the wall of the base component has a thickness in the range of ⅛ inch to ½ inch.

4. The device of claim 1, wherein the one or more ports in the wall of the base component further comprise threads and the one or more anchor components comprise a threaded set screw.

5. The device of claim 1, wherein the one or more ports comprise a pair of aligned complementary ports and the one or more anchor components comprise a pin or bolt configured to extend through the pair of complementary ports and a bore in the log.

6. The device of claim 1, wherein the tip is a single pointed tip.

7. The device of claim 1, wherein the tip is a curved head tip.

8. The device of claim 7, wherein the curved head tip comprises a plurality of teeth.

9. The device of claim 1, wherein the tip is an L-shaped head tip.

10. The device of claim 9, wherein the L-shaped head tip comprises a plurality of teeth.

11. The device of claim 1, wherein the tip is set at an angle of between 40-degrees and 50-degrees relative to the central axis of the receiver component.

12. The device of claim 1, wherein the tip is set at an angle of 45-degrees relative to the central axis of the receiver component.

13. The device of claim 1, further comprising at least one gusset configured to secure the receiver component to the base component.

14. The device of claim 13, wherein the at least one gusset extends substantially the length of the receiver component.

15. A device for machine-assisted tree felling, comprising:
a base component defining an internal cavity accessible from a first end of the base component, wherein the internal cavity is configured to receive an end of a log and abut the end of the log to an end wall aspect of the base component, wherein the base component is in the shape of one of a cylinder and a cuboid and having a wall having a thickness in the range of ⅛ inch to ½ inch;
one or more ports in the wall of the base component configured to receive one or more anchor components, wherein the one or more anchor components are operable to secure the base component to the end of the log;
a receiver component extending from a second end of the base component, wherein the receiver component is configured to removably receive an implement; and
an implement removably received into the receiver component, the implement comprising a tip configured to engage a tree, wherein tip is set in the receiver component at an angle of between 30-degrees and 60-degrees relative to a central axis of the receiver component;
wherein when a log is received into the internal cavity of the base and the one or more anchor components secure the base to the log, the log may be used by a heavy equipment to engage a tree with the implement and apply a directional force to the tree.

16. The device of claim 15, wherein the one or more ports in the wall of the base component further comprise threads and the one or more anchor components comprise a threaded set screw.

17. The device of claim 15, wherein the one or more ports comprise a pair of aligned complementary ports and the one or more anchor components comprise a pin or bolt configured to extend through the pair of complementary ports and a bore in the log.

18. The device of claim 15, wherein the tip is a single pointed tip.

19. The device of claim 15, wherein the tip is a curved head tip comprising a plurality of teeth.

20. The device of claim 15, wherein the tip is an L-shaped head tip comprising a plurality of teeth.

* * * * *